US 9,863,819 B2

(12) United States Patent
Harbers

(10) Patent No.: US 9,863,819 B2
(45) Date of Patent: Jan. 9, 2018

(54) LED-BASED ILLUMINATION MODULE ON-BOARD DIAGNOSTICS

(71) Applicant: Xicato, Inc., San Jose, CA (US)

(72) Inventor: Gerard Harbers, Sunnyvale, CA (US)

(73) Assignee: Xicato, Inc., San Jose, CA (US)

( * ) Notice: Subject to any disclaimer, the term of this patent is extended or adjusted under 35 U.S.C. 154(b) by 713 days.

(21) Appl. No.: 13/956,023

(22) Filed: Jul. 31, 2013

(65) Prior Publication Data
US 2013/0315280 A1   Nov. 28, 2013

Related U.S. Application Data

(63) Continuation of application No. 13/161,341, filed on Jun. 15, 2011, now Pat. No. 8,519,714.
(Continued)

(51) Int. Cl.
*H05B 33/00* (2006.01)
*G01K 11/00* (2006.01)
(Continued)

(52) U.S. Cl.
CPC ......... *G01K 11/00* (2013.01); *H05B 33/0893* (2013.01); *H05B 37/0218* (2013.01);
(Continued)

(58) Field of Classification Search
CPC .................................................. H05B 33/0848
(Continued)

(56) References Cited

U.S. PATENT DOCUMENTS 5,959,316 A   9/1999 Lowery
6,181,086 B1  1/2001 Katyl et al.
(Continued)

FOREIGN PATENT DOCUMENTS

CN   101433129 A   5/2009
EP   2 560 463 A2   2/2013
(Continued)

OTHER PUBLICATIONS

English Abstract of JP 2004-0296841 filed on Mar. 27, 2003 at <http://worldwide.espacenet.com> Visited on Oct. 19, 2011, 2 pages.
International Search Report and Written Opinion dated Sep. 21, 2011 for International Application No. PCT/US2011/040584 filed on Jun. 15, 2011, 14 pages.
International Report on Patentability dated Jan. 3, 2013 for International Application No. PCT/US2011/040584 filed on Jun. 15, 2011, 12 pages.
(Continued)

*Primary Examiner* — Jeff Natalini
(74) *Attorney, Agent, or Firm* — Silicon Valley Patent Group LLP

(57) ABSTRACT

A light emitting diode (LED) based illumination module performs on-board diagnostics. For example, diagnostics may include estimating elapsed lifetime, degradation of phosphor, thermal failure, failure of LEDs, or LED current adjustment based on measured flux or temperature. The elapsed lifetime may be estimated by scaling accumulated elapsed time of operation by an acceleration factor derived from actual operating conditions, such as temperature, current and relative humidity. The degradation of phosphor may be estimated based on a measured response of the phosphor to pulsed light from the LEDs. A thermal failure may be diagnosed using a transient response of the module from a start up condition. The failure of LEDs may be diagnosed based on measured forward voltage. The current for LEDs may adjusted using measured flux values and current values and a desired ratio of flux values. Additionally, the LED current may be scaled based on a measured temperature.

4 Claims, 29 Drawing Sheets

Related U.S. Application Data

(60) Provisional application No. 61/356,525, filed on Jun. 18, 2010.

(51) Int. Cl.

| | | |
|---|---|---|
| *H05B 33/08* | (2006.01) | |
| *H05B 37/02* | (2006.01) | |
| *H05B 37/03* | (2006.01) | |
| *F21V 23/04* | (2006.01) | |
| *F21Y 115/10* | (2016.01) | |
| *F21Y 113/13* | (2016.01) | |

(52) U.S. Cl.
CPC ..... *H05B 37/0227* (2013.01); *H05B 37/0272* (2013.01); *H05B 37/034* (2013.01); *F21V 23/0457* (2013.01); *F21Y 2113/13* (2016.08); *F21Y 2115/10* (2016.08); *Y02B 20/46* (2013.01)

(58) Field of Classification Search
USPC ................................. 324/403–414
See application file for complete search history.

(56) References Cited

U.S. PATENT DOCUMENTS

| | | |
|---|---|---|
| 6,331,756 B1 | 12/2001 | Belliveau |
| 6,351,069 B1 | 2/2002 | Lowery et al. |
| 6,504,301 B1 | 1/2003 | Lowery |
| 6,586,882 B1 | 7/2003 | Harbers |
| 6,600,175 B1 | 7/2003 | Baretz et al. |
| 6,680,569 B2 | 1/2004 | Mueller-Mach et al. |
| 6,812,500 B2 | 11/2004 | Reeh et al. |
| 7,126,162 B2 | 10/2006 | Reeh et al. |
| 7,250,715 B2 | 7/2007 | Mueller et al. |
| 7,479,662 B2 | 1/2009 | Soules et al. |
| 7,564,180 B2 | 7/2009 | Brandes |
| 7,614,759 B2 | 11/2009 | Negley |
| 7,629,621 B2 | 12/2009 | Reeh et al. |
| 7,710,253 B1* | 5/2010 | Fredricks ............ B60Q 11/005 315/76 |
| 7,772,787 B2 | 8/2010 | Ashdown et al. |
| 8,519,714 B2 | 8/2013 | Harbers |
| 8,952,626 B2 | 2/2015 | Huang et al. |
| 2002/0047624 A1 | 4/2002 | Stam et al. |
| 2005/0024219 A1 | 2/2005 | Childers |
| 2006/0109389 A1* | 5/2006 | Ichikawa ............... G09G 3/342 349/1 |
| 2006/0256907 A1 | 11/2006 | Stalker et al. |
| 2007/0081336 A1 | 4/2007 | Bierhuizen et al. |
| 2008/0024694 A1 | 1/2008 | Kondo et al. |
| 2008/0265799 A1* | 10/2008 | Sibert ................ H05B 37/0245 315/292 |
| 2009/0021955 A1* | 1/2009 | Kuang ................. B60Q 3/0259 362/479 |
| 2009/0091913 A1* | 4/2009 | Li ......................... F21V 13/04 362/33 |
| 2009/0254287 A1* | 10/2009 | Ohgoh ............... H05B 33/0893 702/34 |
| 2010/0007277 A1 | 1/2010 | Woodward et al. |
| 2010/0176746 A1 | 7/2010 | Catalano et al. |
| 2010/0231613 A1* | 9/2010 | Hamada ............... G02B 6/0068 345/690 |
| 2010/0301777 A1* | 12/2010 | Kraemer ........... H05B 33/0803 315/312 |
| 2010/0327872 A1 | 12/2010 | Chen et al. |
| 2011/0001436 A1 | 1/2011 | Chemel et al. |
| 2011/0069094 A1* | 3/2011 | Knapp ................. G09G 3/2003 345/690 |
| 2011/0254554 A1* | 10/2011 | Harbers ............. H05B 33/0893 324/414 |
| 2013/0119894 A1 | 5/2013 | Yeh et al. |
| 2015/0008842 A1 | 1/2015 | Harbers et al. |
| 2015/0130368 A1 | 5/2015 | Harbers |

FOREIGN PATENT DOCUMENTS

| | | |
|---|---|---|
| JP | 1999-017230 | 1/1999 |
| JP | 2004-296841 A | 10/2004 |
| JP | 2006147171 | 6/2006 |
| JP | 2008311008 | 12/2008 |
| WO | WO-2006/106451 A1 | 10/2006 |
| WO | WO-2007/036886 A2 | 4/2007 |
| WO | WO2009/034060 A1 | 3/2009 |
| WO | WO 2011/055259 A1 | 5/2011 |
| WO | WO 2013/057646 A1 | 4/2013 |

OTHER PUBLICATIONS

Office Action dated Oct. 26, 2011 for U.S. Appl. No. 13/161,341, filed Jun. 15, 2011 by Xicato, Inc., 14 pages.
Response to Office Action dated Jan. 24, 2012 for U.S. Appl. No. 13/161,341, filed Jun. 15, 2011 by Xicato, Inc., 12 pages.
Final Office Action dated Feb. 22, 2012 for U.S. Appl. No. 13/161,341, filed Jun. 15, 20155 by Xicato, Inc., 15 pages.
Pre-Brief Conference Request mailed on May 22, 2012 for U.S. Appl. No. 13/161,341, filed Jun. 15, 2011 by Xicato, Inc., 7 pages.
Notice of Panel Decision from Pre-Appeal Brief mailed on Jun. 25, 2012 for U.S. Appl. No. 13/161,341, filed Jun. 15, 2011 by Xicato, Inc., 2 pages.
Request for Continued Examination dated Jul. 12, 2012 for U.S. Appl. No. 13/161,341, filed Jun. 15, 2011 by Xicato, Inc., 14 pages.
Applicant Initiated Interview Summary dated Jul. 13, 2012 for U.S. Appl. No. 13/161,341, filed Jun. 15, 2011 by Xicato, Inc., 3 pages.
Office Action dated Feb. 8, 2013 for U.S. Appl. No. 13/161,341, filed Jun. 15, 2011, by Xicato, Inc.,18 pages.
Response to Office Action dated May 8, 2013 for U.S. Appl. No. 13/161,341, filed Jun. 15, 2011 by Xicato, Inc., 11 pages.
Notice of Allowance dated May 24, 2013 for U.S. Appl. No. 13/161,341, filed Jun. 15, 2011 by Xicato, Inc., 9 pages.
English Abstract of JP 2006147171 at <http://worldwide.espacenet.com> Visited on May 8, 2017, 2 pages.
English Abstract of JP 2008311008 at <http://worlwide.espacenet.com> Visited on May 8, 2017, 2 pages.

* cited by examiner

LED-BASED ILLUMINATION MODULE ON-BOARD DIAGNOSTICS

CROSS REFERENCE TO RELATED APPLICATIONS

This application is a continuation of U.S. application Ser. No. 13/161,341, filed Jun. 15, 2011, which, in turn, claims the benefit of U.S. Provisional Application No. 61/356,525, filed Jun. 18, 2010, both of which are incorporated by reference herein in their entireties.

TECHNICAL FIELD

The described embodiments relate to illumination modules that include Light Emitting Diodes (LEDs).

BACKGROUND INFORMATION

The use of LEDs in general lighting is becoming more desirable and more prevalent. Illumination devices that include LEDs typically require large amounts of heat sinking and specific power requirements. Even partial failures with respect to heat sinking, power requirements, or any other system failures, such as degradation of phosphor, operating outside nominal operating conditions, LED failures, etc. can severely degrade performance. However, once a conventional LED-based illumination device is installed it is difficult to access and, thus, problems associated with illumination device are typically not diagnosed or addressed resulting in degradation of performance and reduction in lifetime. Consequently, improvements are desired.

SUMMARY

A light emitting diode (LED) based illumination module is capable of performing on-board diagnostics. For example, diagnostics may include estimating elapsed lifetime, degradation of a phosphor coating, thermal failure, failure of LEDs, or determining LED current adjustment based on measured flux or temperature.

In one implementation, an incremental acceleration factor is determined for a period of time of operation of an LED based illumination module based on a nominal value of an operating condition and an actual value of the operating condition. A cumulative acceleration factor based at least in part on the incremental acceleration factor is determined. An elapsed lifetime of an LED based illumination module is estimated based on scaling an accumulated elapsed time of operation of the LED based illumination module with the cumulative acceleration factor.

In another implementation, a flux intensity response of an LED based illumination module to a pulse of light emitted from an LED of the module is measured and a degradation of a phosphor coating within the module is estimated based on the flux intensity response.

In another implementation, a transient response of an LED based illumination module to illuminating the module from a start up condition is measured and a thermal failure of the module is estimated based on the transient response before an actual thermal failure occurs.

In another implementation, a forward voltage of a plurality of series connected LEDs of an LED based illumination module is measured, wherein the measuring is performed by the LED based illumination module. A failure of at least one of the plurality of series connected LEDs is estimated based on the forward voltage, wherein the estimating is performed by the LED based illumination module.

In another implementation, a first flux intensity value is measured for an LED based illumination module illuminated by a first LED driven with a first current value, wherein the first LED emits light with a first color characteristic. A second flux intensity value is measured for the LED based illumination module illuminated by a second LED driven with a second current value, wherein the second LED emits light with a second color characteristic. A third current value is determined based on the first flux intensity value and the first current value, and a fourth current value is determined based on the second flux intensity value, the second current value, and a predetermined ratio of flux intensity of the first LED to flux intensity of the second LED.

In yet another implementation, a temperature of an LED based illumination module is measured. A current scaling factor is determined based on the temperature, wherein the current scaling factor relates a first current value applied to a first LED with a first color emission characteristic to a second current value applied to a second LED with a second color emission characteristic. A first target current value is determined based on the current scaling factor and a first nominal current value.

DETAILED DESCRIPTION

Reference will now be made in detail to background examples and some embodiments of the invention, examples of which are illustrated in the accompanying drawings.

Figure 1:
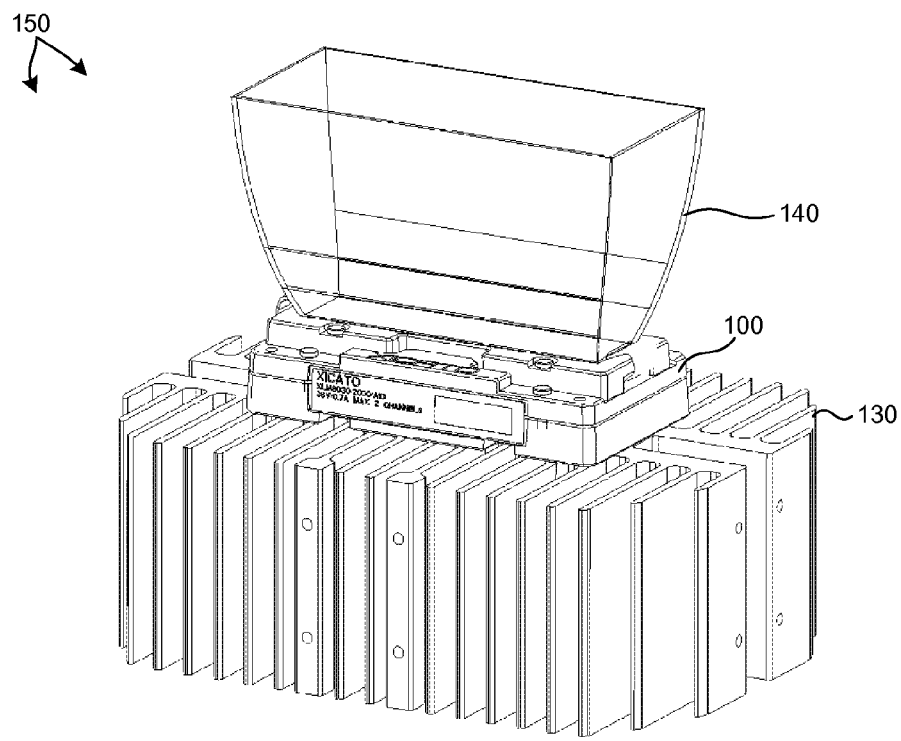
FIGS. 1-2 illustrate two exemplary luminaires, including an illumination device, reflector, and light fixture.
Figure 2:
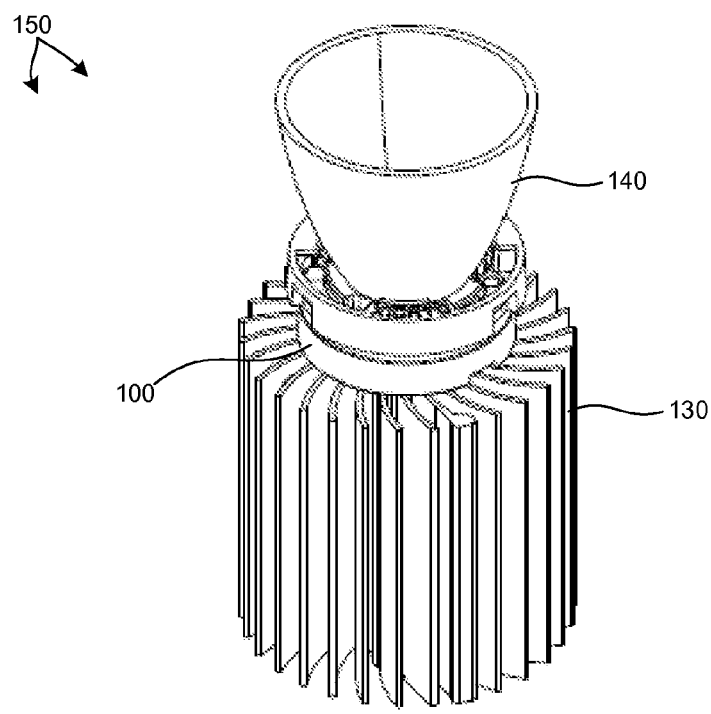

FIGS. 1-2 illustrate two exemplary luminaires. The luminaire illustrated in FIG. 1 includes an illumination module 100 with a rectangular form factor. The luminaire illustrated in FIG. 2 includes an illumination module 100 with a circular form factor. These examples are for illustrative purposes. Examples of illumination modules of general polygonal and elliptical shapes may also be contemplated. Luminaire 150 includes illumination module 100, reflector 140, and light fixture 130. As depicted, light fixture 130 is a heat sink and, thus, may sometimes be referred to as heat sink 130. However, light fixture 130 may include other structural and decorative elements (not shown). Reflector 140 is mounted to illumination module 100 to collimate or deflect light emitted from illumination module 100. The reflector 140 may be made from a thermally conductive material, such as a material that includes aluminum or copper and may be thermally coupled to illumination module 100. Heat flows by conduction through illumination module 100 and the thermally conductive reflector 140. Heat also flows via thermal convection over the reflector 140. Reflector 140 may be a compound parabolic concentrator, where the concentrator is constructed of or coated with a highly reflecting material. Optical elements, such as a diffuser or reflector 140 may be removably coupled to illumination module 100, e.g., by means of threads, a clamp, a twist-lock mechanism, or other appropriate arrangement. A luminaire 150 that includes illumination module 100 could also be a retrofit lamp.

Illumination module 100 is mounted to light fixture 130. As depicted in FIGS. 1 and 2, illumination module 100 is mounted to heat sink 130. Heat sink 130 may be made from a thermally conductive material, such as a material that includes aluminum or copper and may be thermally coupled to illumination module 100. Heat flows by conduction through illumination module 100 and the thermally conductive heat sink 130. Heat also flows via thermal convection over heat sink 130. Illumination module 100 may be attached to heat sink 130 by way of screw threads to clamp the illumination module 100 to the heat sink 130. To facilitate easy removal and replacement of illumination module 100, illumination module 100 may be removably coupled to heat sink 130, e.g., by means of a clamp mechanism, a twist-lock mechanism, or other appropriate arrangement. Illumination module 100 includes at least one thermally conductive surface that is thermally coupled to heat sink 130, e.g., directly or using thermal grease, thermal tape, thermal pads, or thermal epoxy. For adequate cooling of the LEDs, a thermal contact area of at least 50 square millimeters, but preferably 100 square millimeters should be used per one watt of electrical energy flow into the LEDs on the board. For example, in the case when 20 LEDs are used, a 1000 to 2000 square millimeter heatsink contact area should be used. Using a larger heat sink 130 may permit the LEDs 102 to be driven at higher power, and also allows for different heat sink designs. For example, some designs may exhibit a cooling capacity that is less dependent on the orientation of the heat sink. In addition, fans or other solutions for forced cooling may be used to remove the heat from the device. The bottom heat sink may include an aperture so that electrical connections can be made to the illumination module 100.

Figure 3A:
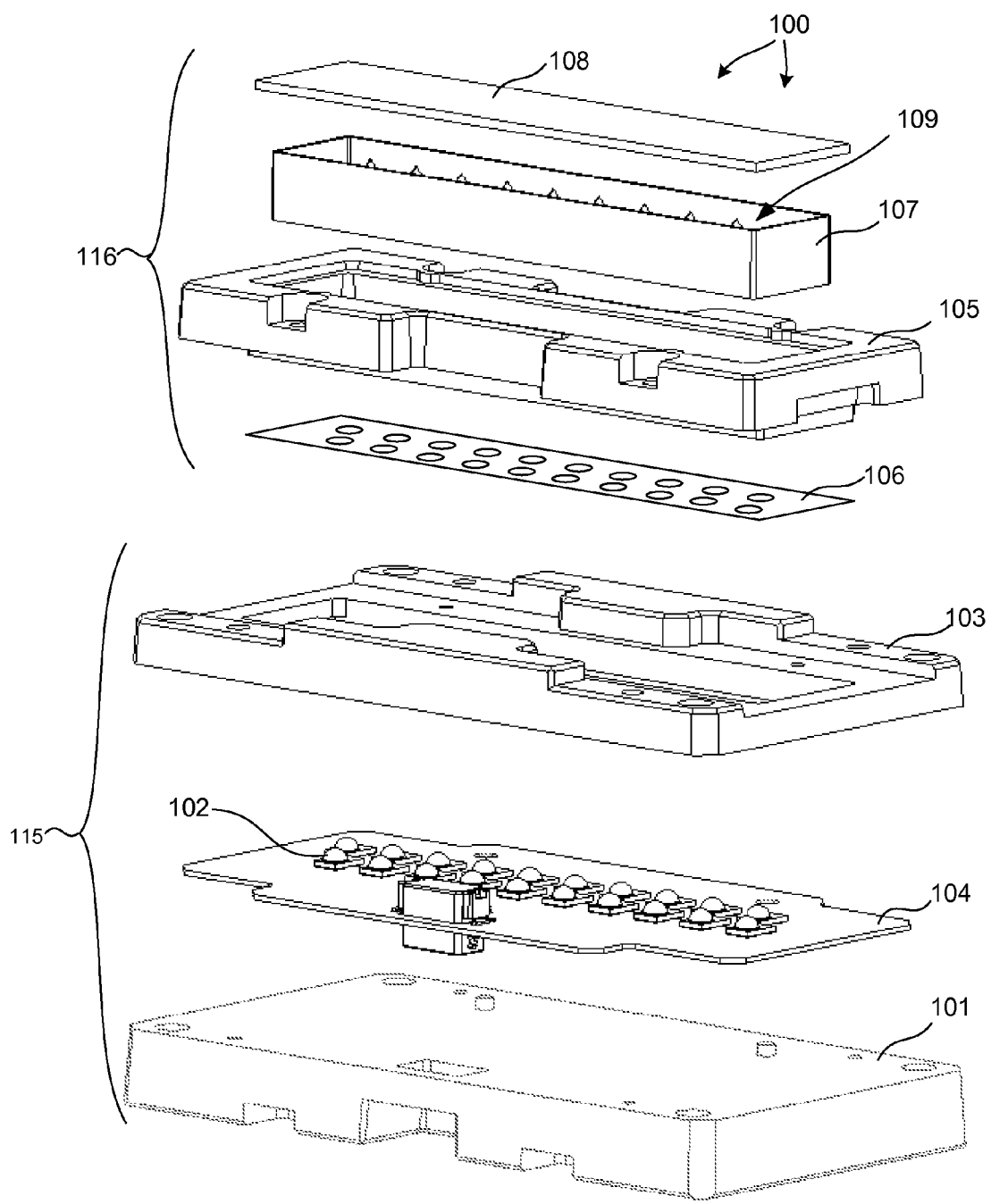
FIG. 3A shows an exploded view illustrating components of LED based illumination device as depicted in FIG. 1.
Figure 3B:
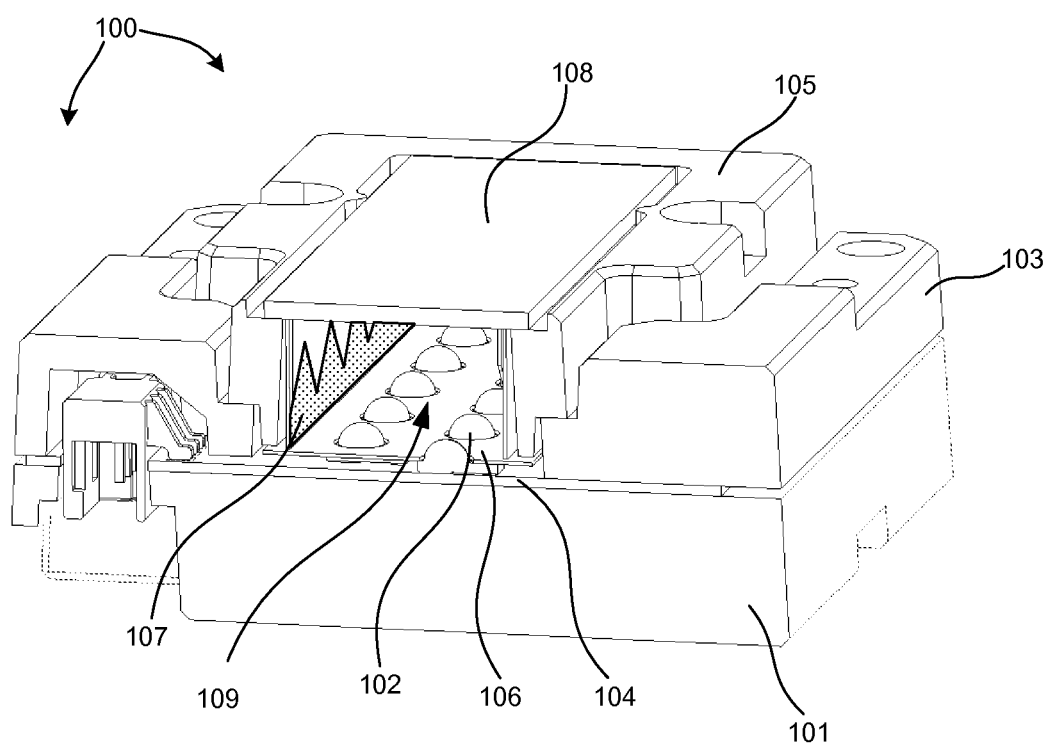
FIG. 3B illustrates a perspective, cross-sectional view of LED based illumination device as depicted in FIG. 1.

FIG. 3A shows an exploded view illustrating components of LED based illumination module 100 as depicted in FIG. 1. It should be understood that as defined herein an LED based illumination module is not an LED, but is an LED light source or fixture or component part of an LED light source or fixture. LED based illumination module 100 includes one or more LED die or packaged LEDs and a mounting board to which LED die or packaged LEDs are attached. FIG. 3B illustrates a perspective, cross-sectional view of LED illumination module 100 as depicted in FIG. 1. LED based illumination module 100 includes one or more solid state light emitting elements, such as light emitting diodes (LEDs) 102, mounted on mounting board 104. Mounting board 104 is attached to mounting base 101 and secured in position by mounting board retaining ring 103. Together, mounting board 104 populated by LEDs 102 and mounting board retaining ring 103 comprise light source sub-assembly 115. Light source sub-assembly 115 is operable to convert electrical energy into light using LEDs 102. The light emitted from light source sub-assembly 115 is directed to light conversion sub-assembly 116 for color mixing and color conversion. Light conversion sub-assembly 116 includes cavity body 105 and output window 108, and optionally includes either or both bottom reflector insert 106 and sidewall insert 107. Output window 108 is fixed to the top of cavity body 105. Cavity body 105 includes interior sidewalls such that the interior sidewalls direct light from the LEDs 102 to the output window 108 when cavity body 105 is mounted over light source sub-assembly 115. Bottom reflector insert 106 may optionally be placed over mounting board 104. Bottom reflector insert 106 includes holes such that the light emitting portion of each LED 102 is not blocked by bottom reflector insert 106. Sidewall insert 107 may optionally be placed inside cavity body 105 such that the interior surfaces of sidewall insert 107 direct light from the LEDs 102 to the output window when cavity body 105 is mounted over light source sub-assembly 115. Although as depicted, the interior sidewalls of cavity body 105 are rectangular in shape as viewed from the top of illumination module 100, other shapes may be contemplated (e.g., clover shaped or polygonal). In addition, the interior sidewalls of cavity body 105 may taper outward from mounting board 104 to output window 108, rather than perpendicular to output window 108 as depicted.

In this embodiment, the sidewall insert 107, output window 108, and bottom reflector insert 106 disposed on mounting board 104 define a light mixing cavity 109 in the LED based illumination module 100 in which a portion of light from the LEDs 102 is reflected until it exits through output window 108. Reflecting the light within the cavity 109 prior to exiting the output window 108 has the effect of mixing the light and providing a more uniform distribution of the light that is emitted from the LED based illumination module 100. Portions of sidewall insert 107 may be coated with a wavelength converting material. Furthermore, portions of output window 108 may be coated with the same or a different wavelength converting material. In addition, portions of bottom reflector insert 106 may be coated with the same or a different wavelength converting material. The photo converting properties of these materials in combination with the mixing of light within cavity 109 results in a color converted light output by output window 108. By tuning the chemical properties of the wavelength converting materials and the geometric properties of the coatings on the interior surfaces of cavity 109 (e.g., layer thickness, phosphor particle size, phosphor mixture, and particle density), specific color properties of light output by output window 108 may be specified, e.g., color point, color temperature, and color rendering index (CRI).

For purposes of this patent document, a wavelength converting material is any single chemical compound or mixture of different chemical compounds that performs a color conversion function, e.g., absorbs light of one peak wavelength and emits light at another peak wavelength.

Cavity 109 may be filled with a non-solid material, such as air or an inert gas, so that the LEDs 102 emit light into the non-solid material. By way of example, the cavity may be hermetically sealed and Argon gas used to fill the cavity. Alternatively, Nitrogen may be used. In other embodiments, cavity 109 may be filled with a solid encapsulant material. By way of example, silicone may be used to fill the cavity.

The LEDs 102 can emit different or the same colors, either by direct emission or by phosphor conversion, e.g., where phosphor layers are applied to the LEDs as part of the LED package. Thus, the illumination module 100 may use any combination of colored LEDs 102, such as red, green, blue, amber, or cyan, or the LEDs 102 may all produce the same color light or may all produce white light. For example, the LEDs 102 may all emit either blue or UV light. When used in combination with phosphors (or other wavelength conversion means), which may be, e.g., in or on the output window 108, applied to the sidewalls of cavity body 105, or applied to other components placed inside the cavity (not shown), such that the output light of the illumination module 100 has the color as desired.

The mounting board 104 provides electrical connections to the attached LEDs 102 to a power supply (not shown). In one embodiment, the LEDs 102 are packaged LEDs, such as the Luxeon Rebel manufactured by Philips Lumileds Lighting. Other types of packaged LEDs may also be used, such as those manufactured by OSRAM (Ostar package), Luminus Devices (USA), Cree (USA), Nichia (Japan), or Tridonic (Austria). As defined herein, a packaged LED is an assembly of one or more LED die that contains electrical connections, such as wire bond connections or stud bumps, and possibly includes an optical element and thermal, mechanical, and electrical interfaces. The LEDs 102 may include a lens over the LED chips. Alternatively, LEDs without a lens may be used. LEDs without lenses may include protective layers, which may include phosphors. The phosphors can be applied as a dispersion in a binder, or applied as a separate layer. Each LED 102 includes at least one LED chip or die, which may be mounted on a submount. The LED chip typically has a size about 1 mm by 1 mm by 0.5 mm, but these dimensions may vary. In some embodiments, the LEDs 102 may include multiple chips. The multiple chips can emit light similar or different colors, e.g., red, green, and blue. The LEDs 102 may emit polarized light or non-polarized light and LED based illumination module 100 may use any combination of polarized or non-polarized LEDs. In some embodiments, LEDs 102 emit either blue or UV light because of the efficiency of LEDs emitting in these wavelength ranges. In addition, different phosphor layers may be applied on different chips on the same submount. The submount may be ceramic or other appropriate material. The submount typically includes electrical contact pads on a bottom surface that are coupled to contacts on the mounting board 104. Alternatively, electrical bond wires may be used to electrically connect the chips to a mounting board. Along with electrical contact pads, the LEDs 102 may include thermal contact areas on the bottom surface of the submount through which heat generated by the LED chips can be extracted. The thermal contact areas are coupled to heat spreading layers on the mounting board 104. Heat spreading layers may be disposed on any of the top, bottom, or intermediate layers of mounting board 104. Heat spreading layers may be connected by vias that connect any of the top, bottom, and intermediate heat spreading layers.

In some embodiments, the mounting board 104 conducts heat generated by the LEDs 102 to the sides of the board 104 and the bottom of the board 104. In one example, the bottom of mounting board 104 may be thermally coupled to a heat sink 130 (shown in FIGS. 1 and 2) via mounting base 101. In other examples, mounting board 104 may be directly coupled to a heat sink, or a lighting fixture and/or other mechanisms to dissipate the heat, such as a fan. In some embodiments, the mounting board 104 conducts heat to a heat sink thermally coupled to the top of the board 104. For example, mounting board retaining ring 103 and cavity body 105 may conduct heat away from the top surface of mounting board 104. Mounting board 104 may be an FR4 board, e.g., that is 0.5 mm thick, with relatively thick copper layers, e.g., 30 µm to 100 µm, on the top and bottom surfaces that serve as thermal contact areas. In other examples, the board 104 may be a metal core printed circuit board (PCB) or a ceramic submount with appropriate electrical connections. Other types of boards may be used, such as those made of alumina (aluminum oxide in ceramic form), or aluminum nitride (also in ceramic form).

Mounting board 104 includes electrical pads to which the electrical pads on the LEDs 102 are connected. The electrical pads are electrically connected by a metal, e.g., copper, trace to a contact, to which a wire, bridge or other external electrical source is connected. In some embodiments, the electrical pads may be vias through the board 104 and the electrical connection is made on the opposite side, i.e., the bottom, of the board. Mounting board 104, as illustrated, is rectangular in dimension. LEDs 102 mounted to mounting board 104 may be arranged in different configurations on rectangular mounting board 104. In one example LEDs 102 are aligned in rows extending in the length dimension and in columns extending in the width dimension of mounting board 104. In another example, LEDs 102 are arranged in a hexagonally closely packed structure. In such an arrangement each LED is equidistant from each of its immediate neighbors. Such an arrangement is desirable to increase the uniformity and efficiency of light emitted from the light source sub-assembly 115.

Figure 4:
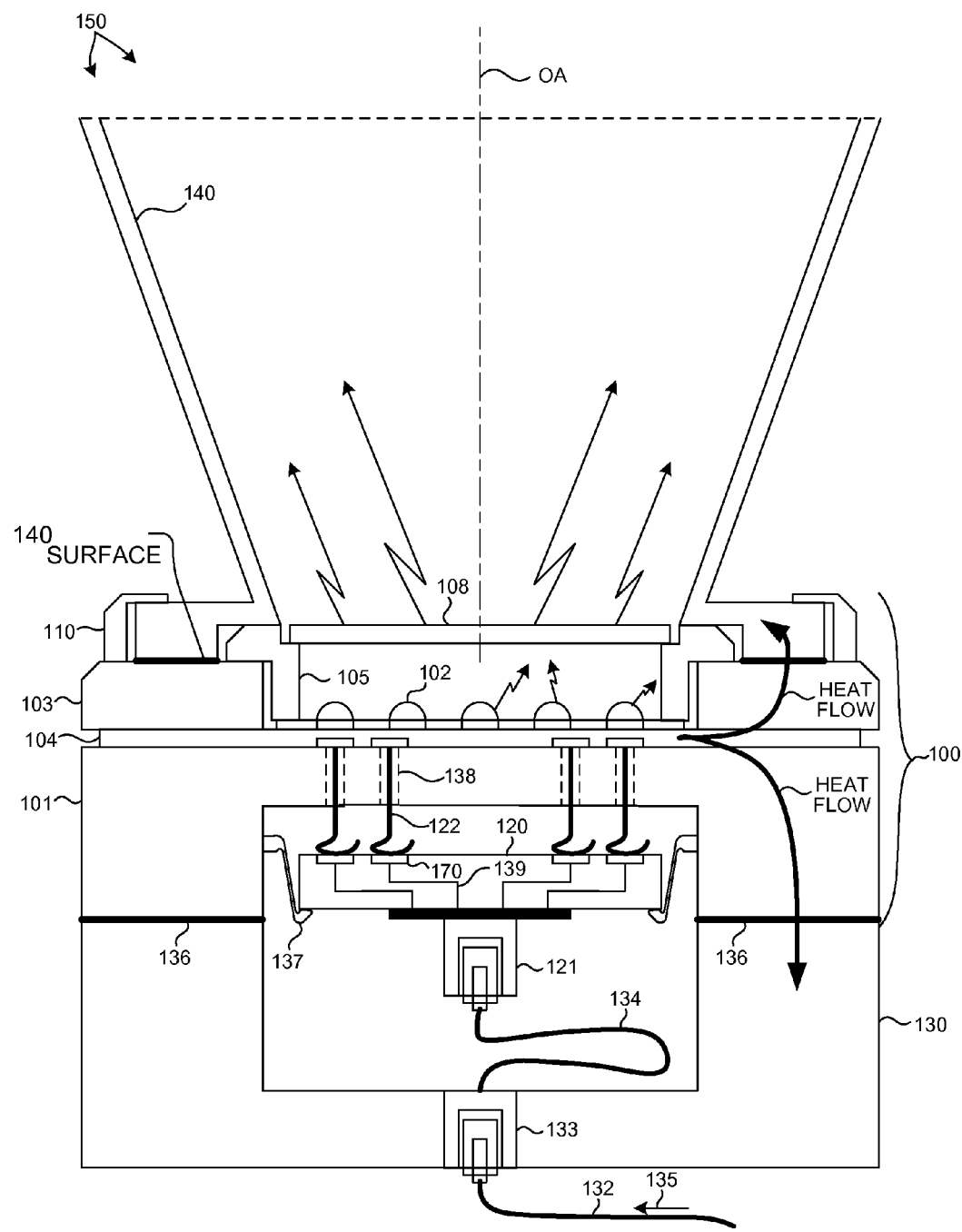
FIG. 4 illustrates a cut-away view of luminaire as depicted in FIG. 2, with an electrical interface module coupled between the LED illumination device and the light fixture.

FIG. 4 illustrates a cut-away view of luminaire 150 as depicted in FIG. 2. Reflector 140 is removably coupled to illumination module 100. Reflector 140 is coupled to module 100 by a twist-lock mechanism. Reflector 140 is aligned with module 100 by bringing reflector 140 into contact with module 100 through openings in reflector retaining ring 110. Reflector 140 is coupled to module 100 by rotating reflector 140 about optical axis (OA) to an engaged position. In the engaged position, the reflector 140 is captured between mounting board retaining ring 103 and reflector retaining ring 110. In the engaged position, an interface pressure may be generated between mating thermal interface surface 140$_{surface}$ of reflector 140 and mounting board retaining ring 103. In this manner, heat generated by LEDs 102 may be conducted via mounting board 104, through mounting board retaining ring 103, through interface 140$_{surface}$, and into reflector 140. In addition, a plurality of electrical connections may be formed between reflector 140 and retaining ring 103.

Illumination module 100 includes an electrical interface module (EIM) 120. As illustrated, EIM 120 may be removably attached to illumination module 100 by retaining clips 137. In other embodiments, EIM 120 may be removably attached to illumination module 100 by an electrical connector coupling EIM 120 to mounting board 104. EIM 120 may also be coupled to illumination module 100 by other fastening means, e.g., screw fasteners, rivets, or snap-fit connectors. As depicted EIM 120 is positioned within a cavity of illumination module 100. In this manner, EIM 120 is contained within illumination module 100 and is accessible from the bottom side of illumination module 100. In other embodiments, EIM 120 may be at least partially positioned within light fixture 130. The EIM 120 communicates electrical signals from light fixture 130 to illumination module 100. Electrical conductors 132 are coupled to light fixture 130 at electrical connector 133. By way of example, electrical connector 133 may be a registered jack (RJ) connector commonly used in network communications applications. In other examples, electrical conductors 132 may be coupled to light fixture 130 by screws or clamps. In other examples, electrical conductors 132 may be coupled to light fixture 130 by a removable slip-fit electrical connector. Connector 133 is coupled to conductors 134. Conductors 134 are removably coupled to electrical connector 121 that is mounted to EIM 120. Similarly, electrical connector 121 may be a RJ connector or any suitable removable electrical connector. Connector 121 is fixedly coupled to EIM 120. Electrical signals 135 are communicated over conductors 132 through electrical connector 133, over conductors 134, through electrical connector 121 to EIM 120. Electrical signals 135 may include power signals and data signals. EIM 120 routes electrical signals 135 from electrical connector 121 to appropriate electrical contact pads on EIM 120. For example, conductor 139 within EIM 120 may couple connector 121 to electrical contact pad 170 on the top surface of EIM 120. Alternatively, connector 121 may be mounted on the same side of EIM 120 as the electrical contact pads 170, and thus, a surface conductor may couple connector 121 to the electrical contact pads 170. As illustrated, spring pin 122 removably couples electrical contact pad 170 to mounting board 104 through an aperture 138 in mounting base 101. Spring pins couple contact pads disposed on the top surface of EIM 120 to contact pads of mounting board 104. In this manner, electrical signals are communicated from EIM 120 to mounting board 104. Mounting board 104 includes conductors to appropriately couple LEDs 102 to the contact pads of mounting board 104. In this manner, electrical signals are communicated from mounting board 104 to appropriate LEDs 102 to generate light. EIM 120 may be constructed from a printed circuit board (PCB), a metal core PCB, a ceramic substrate, or a semiconductor substrate. Other types of boards may be used, such as those made of alumina (aluminum oxide in ceramic form), or aluminum nitride (also in ceramic form). EIM 120 may be a constructed as a plastic part including a plurality of insert molded metal conductors.

Mounting base 101 is replaceably coupled to light fixture 130. In the illustrated example, light fixture 130 acts as a heat sink. Mounting base 101 and light fixture 130 are coupled together at a thermal interface 136. At the thermal interface 136, a portion of mounting base 101 and a portion of light fixture 130 are brought into contact as illumination module 100 is coupled to light fixture 130. In this manner, heat generated by LEDs 102 may be conducted via mounting board 104, through mounting base 101, through interface 136, and into light fixture 130.

To remove and replace illumination module 100, illumination module 100 is decoupled from light fixture 130 and electrical connector 121 is disconnected. In one example, conductors 134 includes sufficient length to allow sufficient separation between illumination module 100 and light fixture 130 to allow an operator to reach between fixture 130 and module 100 to disconnect connector 121. In another example, connector 121 may be arranged such that a displacement between illumination module 100 from light fixture 130 operates to disconnect connector 121. In another example, conductors 134 are wound around a spring-loaded reel. In this manner, conductors 134 may be extended by unwinding from the reel to allow for connection or disconnection of connector 121, and then conductors 134 may be retracted by winding conductors 134 onto the reel by action of the spring-loaded reel.

Figure 5:
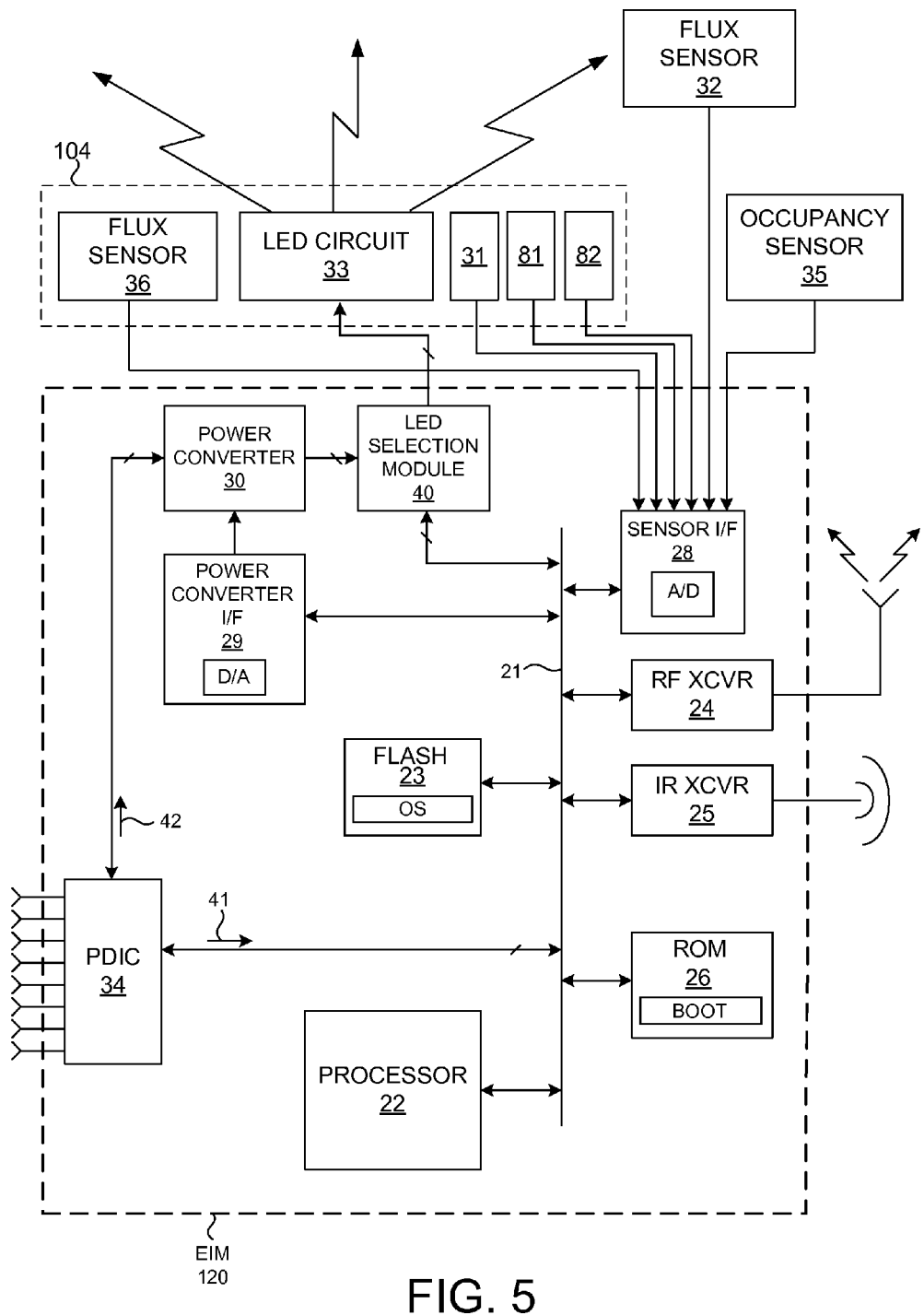
FIG. 5 is a schematic diagram illustrative of an electrical interface module.

FIG. 5 is a schematic diagram illustrative of EIM 120 in greater detail. In the depicted embodiment, EIM 120 includes bus 21, powered device interface controller (PDIC) 34, processor 22, elapsed time counter module (ETCM) 27, an amount of non-volatile memory 26 (e.g., EPROM), an amount of non-volatile memory 23 (e.g., flash memory), infrared transceiver 25, RF transceiver 24, sensor interface 28, power converter interface 29, power converter 30, and LED selection module 40. LED mounting board 104 is coupled to EIM 120. LED mounting board 104 includes flux sensor 36, LED circuitry 33 including LEDs 102, temperature sensor 31, current sensor 81, and humidity sensor 82. EIM 120 is also coupled to flux sensor 32 and occupancy sensor 35 mounted to light fixture 130. In some embodiments, flux sensor 32 and occupancy sensor 35 may be mounted to an optic, such as reflector 140 as discussed with respect to FIG. 8. In some embodiments, an occupancy sensor may also be mounted to mounting board 104. In some embodiments, any of an accelerometer, a pressure sensor, a current sensor, and a humidity sensor may be mounted to mounting board 104. For example, an accelerometer may be added to detect the orientation of illumination module 100 with respect to the gravitational field. In another example, the accelerometer may provide a measure of vibration present in the operating environment of module 100. In another example, a humidity sensor may be added to provide a measure of the moisture content of the operating environment of module 100. For example, if module 100 is sealed to reliably operate in wet conditions, the humidity sensor may be employed to detect a failure of the seal and contamination of the module. In another example, a pressure sensor may be employed to provide a measure of the pressure of the operating environment of module 100. For example, if module 100 is sealed and evacuated, or alternatively, sealed and pressurized, the pressure sensor may be employed to detect a failure of the seal.

PDIC 34 is coupled to connector 121 and receives electrical signals 135 over conductors 134. In one example, PDIC 34 is a device complying with the IEEE 802.3 protocol for transmitting power and data signals over multi-conductor cabling (e.g., category 5e cable). PDIC 34 separates incoming signals 135 into data signals 41 communicated to bus 21 and power signals 42 communicated to power converter 30 in accordance with the IEEE 802.3 protocol. In some embodiments, the source of power to module 100 may be a battery for backup applications or for solar applications. Power converter 30 operates to perform power conversion to generate electrical signals to drive one or more LED circuits of LED circuitry 33. In some embodiments, power converter 30 operates in a current control mode to supply a controlled amount of current to LED circuits within a predefined voltage range. In some embodiments, power converter 30 is a direct current to direct current (DC-DC) power converter. In these embodiments, power signals 42 may have a nominal voltage of 48 volts in accordance with the IEEE 802.3 standard. Power signals 42 are stepped down in voltage by DC-DC power converter 30 to voltage levels that meet the voltage requirements of each LED circuit coupled to DC-DC converter 30.

In some other embodiments, power converter 30 is an alternating current to direct current (AC-DC) power converter. In yet other embodiments, power converter 30 is an alternating current to alternating current (AC-AC) power converter. In embodiments employing AC-AC power converter 30, LEDs 102 mounted to mounting board 104 generate light from AC electrical signals. Power converter 30 may be single channel or multi-channel. Each channel of power converter 30 supplies electrical power to one LED circuit of series connected LEDs. In one embodiment power converter 30 operates in a constant current mode. This is particularly useful where LEDs are electrically connected in series. In some other embodiments, power converter 30 may operate as a constant voltage source. This may be particularly useful where LEDs are electrically connected in parallel.

As depicted, power converter 30 is coupled to power converter interface 29. In this embodiment, power converter interface 29 includes a digital to analog (D/A) capability. Digital commands may be generated by operation of processor 22 and communicated to power converter interface 29 over bus 21. Power converter interface 29 converts the digital command signals to analog signals and communicates the resulting analog signals to power converter 30. Power converter 30 adjusts the current communicated to coupled LED circuits in response to the received analog signals. In some examples, power converter 30 may shut down in response to the received signals. In other examples, power converter 30 may pulse or modulate the current communicated to coupled LED circuits in response to the received analog signals. In some embodiments, power converter 30 is operable to receive digital command signals directly. In these embodiments, power converter interface 29 is not implemented. In some embodiments, power converter 30 is operable to transmit signals. For example, power converter 30 may transmit a signal indicating a power failure condition or power out of regulation condition through power converter interface 29 to bus 21.

EIM 120 includes several mechanisms for receiving data from and transmitting data to devices communicatively linked to illumination module 100. EIM 120 may receive and transmit data over PDIC 34, RF transceiver 24, and IR transceiver 25. In addition, EIM 120 may broadcast data by controlling the light output from illumination module 100. For example, processor 22 may command the current supplied by power converter 30 to periodically flash, or otherwise modulate in frequency or amplitude, the light output of LED circuitry 33. The pulses may be detectable by humans, e.g., flashing the light output by illumination module 100 in a sequence of three, one second pulses, every minute. The pulses may also be undetectable by humans, but detectable by a flux detector, e.g., pulsing the light output by illumination module 100 at one kilohertz. In these embodiments, the light output of illumination module 100 can be modulated to indicate a code. Examples of information transmitted by EIM 120 by any of the above-mentioned means includes accumulated elapsed time of module 100, LED failure, serial number, occupancy sensed by occupancy sensor 35, flux sensed by on-board flux sensor 36, flux sensed by flux sensor 32, temperature sensed by temperature sensor 31, estimated lifetime of module 100, lifetime alert, phosphor response measurement data, phosphor decay alert, thermal failure of luminaire 150, and power failure condition. In addition, EIM 120 may receive messages by sensing a modulation or cycling of electrical signals supplying power to module 100. For example, power line voltage may be cycled three times in one minute to indicate a request for module 100 to communicate its serial number.

Figure 6:
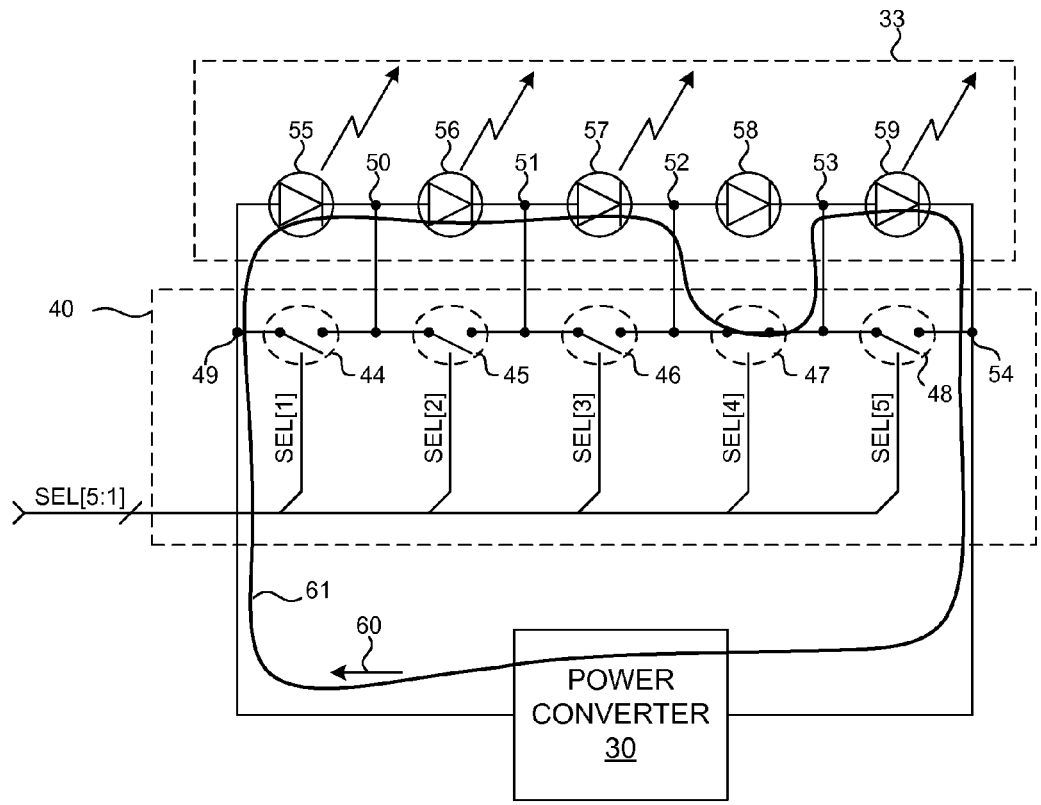
FIG. 6 is a schematic illustrative of LED selection module on the electrical interface module.

FIG. 6 is a schematic illustrative of LED selection module 40 in greater detail. As depicted, LED circuit 33 includes LEDs 55-59 connected in series and coupled to LED selection module 140. Although LED circuit 33 includes five series connected LEDs, more or less LEDs may be contemplated. In addition, LED board 104 may include more than one circuit of series connected LEDs. As depicted, LED selection module 40 includes five series connected switching elements 44-48. Each lead of a switching element is coupled to a corresponding lead of an LED of LED circuit 33. For example, a first lead of switching element 44 is coupled to the anode of LED 55 at voltage node 49. In addition, a second lead of switching element 44 is coupled to the cathode of LED 55 at voltage node 50. In a similar manner switching elements 45-48 are coupled to LEDs 55-58 respectively. In addition, an output channel of power converter 30 is coupled between voltage nodes 49 and 54 forming a current loop 61 conducting current 60. In some embodiments, switching elements 44-48 may be transistors (e.g., bipolar junction transistors or field effect transistors).

LED selection module 40 selectively powers LEDs of an LED circuit 33 coupled to a channel of power converter 30. For example, in an open position, switching element 44 conducts substantially no current between voltage nodes 49 and 50. In this manner, current 60 flowing from voltage node 49 to voltage node 50 passes through LED 55. In this case, LED 55 offers a conduction path of substantially lower resistance than switching element 44, thus current passes through LED 55 and light is generated. In this way switching element 44 acts to "switch on" LED 55. By way of example, in a closed position, switching element 47 is substantially conductive. Current 60 flows from voltage node 52 to node 53 through switching element 47. In this case, switching element 47 offers a conduction path of substantially lower resistance than LED 57, thus current 60 passes through switching element 47, rather than LED 57, and LED 57 does not generate light. In this way switching element 47 acts to "switch off" LED 58. In the described manner, switching elements 44-48 may selectively power LEDs 55-59.

A binary control signal SEL[5:1] is received onto LED selection module 40. Control signal SEL[5:1] controls the state of each of switching elements 44-48, and thus determines whether each of LEDs 55-59 is "switched on" or "switched off." In one embodiment, control signal, SEL, is generated by processor 22 in response to a condition detected by EIM 120 (e.g., reduction in flux sensed by flux sensor 36). In other embodiments, control signal, SEL, is generated by processor 22 in response to a command signal received onto EIM 120 (e.g., communication received by RF transceiver 24, IR transceiver 25, or PDIC 34). In another embodiment, the control signal, SEL, is communicated from an on-board controller of the LED illumination device.

Figure 7:
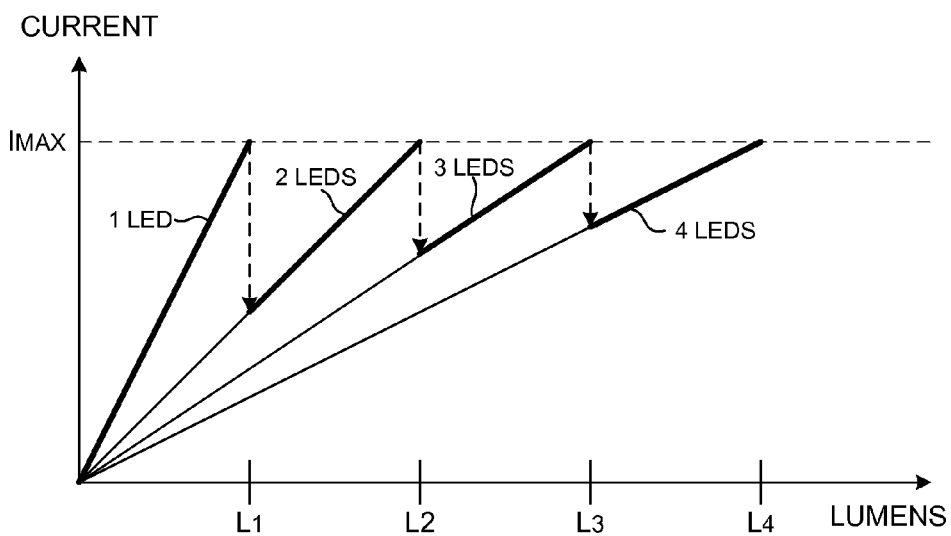
FIG. 7 is illustrative of how LEDs may be switched on or off to change the amount of flux emitted by powered LEDs.

FIG. 7 is illustrative of how LEDs may be switched on or off to change the amount of flux emitted by powered LEDs of LED circuit 33. Current 60 is plotted against the luminous flux emitted by powered LEDs of LED circuit 33. Due to physical limitations of LEDs 55-59, current 60 is limited to a maximum current level, $I_{max}$, above which lifetime becomes severely limited. In one example, $I_{max}$, may be 0.7 Ampere. In general LEDs 55-59 exhibit a linear relationship between luminous flux and drive current. FIG. 7 illustrates luminous flux emitted as a function of drive current for four cases: when one LED is "switched on", when two LEDs are "switched on", when three LEDs are "switched on", and when four LEDs are "switched on". In one example, a luminous output, $L_3$, may be achieved by switching on three LEDs and driving them at Imax. Alternatively, luminous output, $L_3$, may be achieved by switching on four LEDs and driving them with less current. When reduced amounts of light are required for a period of time (e.g., dimming of restaurant lighting), light selection module 40 may be used to selectively "switch off" LEDs, rather than simply scaling back current. This may be desirable to increase the lifetime of "switched off" LEDs in light fixture by not operating them for selected periods. The LEDs selected to be "switched off" may be scheduled such that each LED is "switched off" for approximately the same amount of time as the others. In this way, the lifetime of illumination module 100 may be extended by extending the life of each LED by approximately the same amount of time.

LEDs 55-59 may be selectively switched on or off to respond to an LED failure. In one embodiment, illumination module 100 includes extra LEDs that are "switched off." However, when an LED failure occurs, one or more of the extra LEDs are "switched on" to compensate for the failed LED. In another example, extra LEDs may be "switched on" to provide additional light output. This may be desirable when the required luminous output of illumination module 100 is not known prior to installation or when illumination requirements change after installation.

Figure 8:
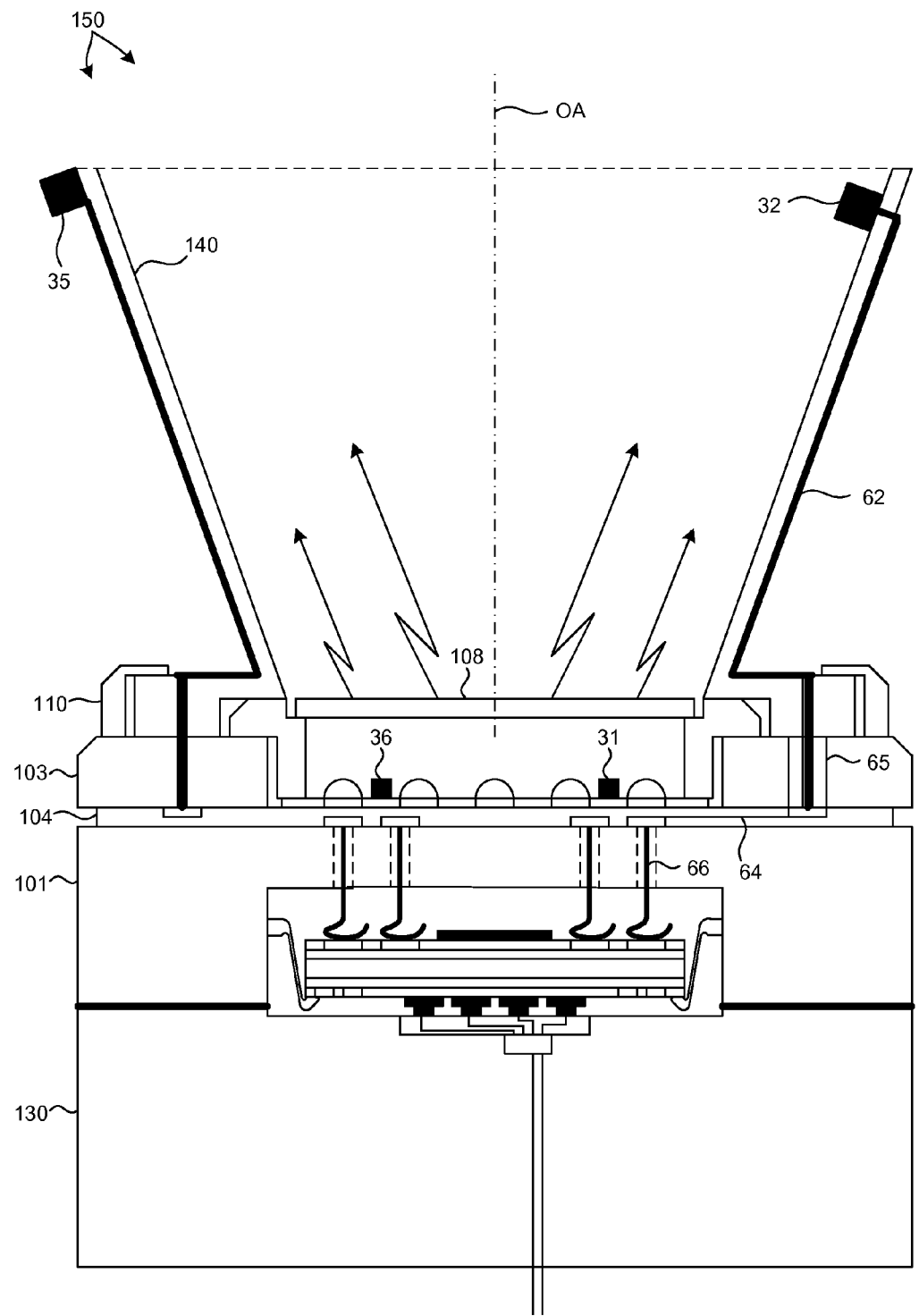
FIG. 8 illustrates a reflector including at least one sensor and at least one electrical conductor.

FIG. 8 illustrates reflector 140 including at least one sensor and at least one electrical conductor. FIG. 8 illustrates flux sensor 32 mounted on an interior surface of reflector 140. Sensor 32 is positioned such that there is a direct line-of-sight between the light sensing surfaces of sensor 32 and output window 108 of illumination module 100. In one embodiment, sensor 32 is a silicon diode sensor. Sensor 32 is coupled to electrical conductor 62. Conductor 62 is a conductive trace molded into reflector 140. In other embodiments, the conductive trace may be printed onto reflector 140. Conductor 62 passes through the base of reflector 140 and is coupled to a conductive via 65 of mounting board retaining ring 103 when reflector 140 is mounted to illumination module 100. Conductive via 65 is coupled to conductor 64 of mounting board 104. Conductor 64 is coupled to EIM 120 via spring pin 66. In this manner, flux sensor 32 is electrically coupled to EIM 120. In other embodiments, conductor 62 is coupled directly to conductor 64 of mounting board 104. Similarly, occupancy sensor 35 may be electrically coupled to EIM 120. In some embodiments, sensors 32 and 35 may be removably coupled to reflector 140 by means of a connector. In other embodiments, sensors 32 and 35 may be fixedly coupled to reflector 140.

Figure 9:
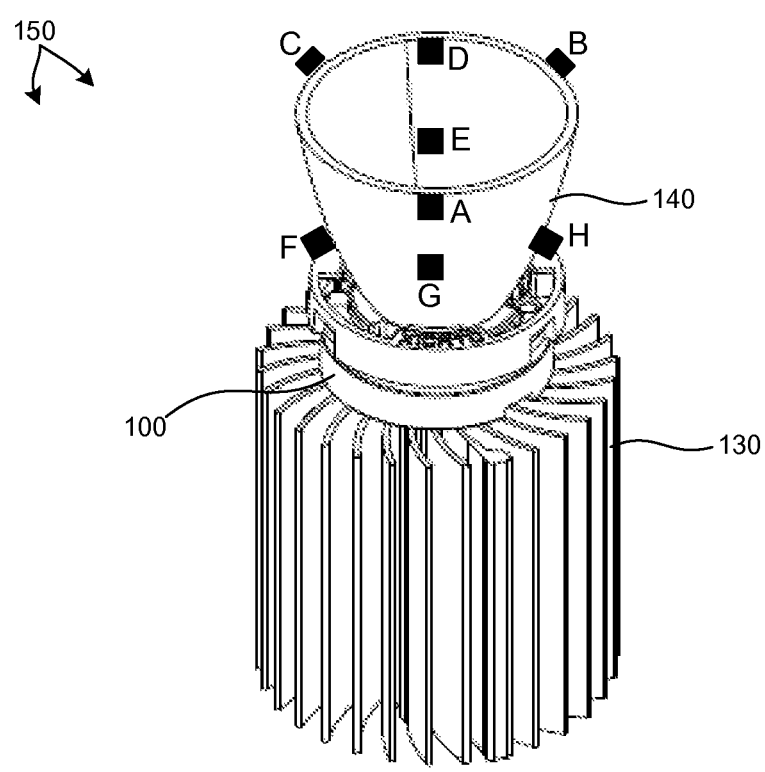
FIG. 9 is illustrative of locations where color, flux, and occupancy sensors may be positioned on a reflector.

FIG. 8 also illustrates flux sensor 36 and temperature sensor 31 attached to mounting board 104 of illumination module 100. Sensors 31 and 36 provide information about the operating condition of illumination module 100 at board level. Any of sensors 31, 32, 35, 36, 81, and 82 may be one of a plurality of such sensors placed at a variety of locations on mounting board 104, reflector 140, light fixture 130, and illumination module 100. In addition, a color sensor may be employed. FIG. 9 is illustrative of locations where color, flux, and occupancy sensors may be positioned on reflector 140 for exemplary purposes. In one example, sensors may be located in locations A, B, and C. Locations A-C are outwardly facing so that sensors disposed at locations A-C may sense color, flux, or occupancy of a scene illuminated by module 100. Similarly, sensors at locations F, G, and H are also outwardly facing and may sense color, flux, or occupancy of a scene illuminated by module 100. Sensors may also be disposed at locations D and E. Locations D and E are inwardly facing and may detect flux or color of the illuminance of module 100. The locations of sensors D and E differ in their angle sensitivity to light output by module 100 and differences may be used to characterize the properties of light output by module 100. By analyzing the differences between measurements taken at board level locations and locations within reflector 140, reflector performance can be decoupled from board level performance. Ambient light can be sensed with externally facing flux sensors, e.g., sensors at locations A-C and F-H. The types of sensors that could be employed includes ambient light sensors, proximity sensors, temperature sensors, current sensors, sound sensors, flux sensors, CO2 sensors, CO sensors, and particle detectors. Such sensors may also be interfaced with security systems via EIM 120. For outdoor applications, sensors can monitor traffic conditions, weather conditions, and light levels.

Figure 10:
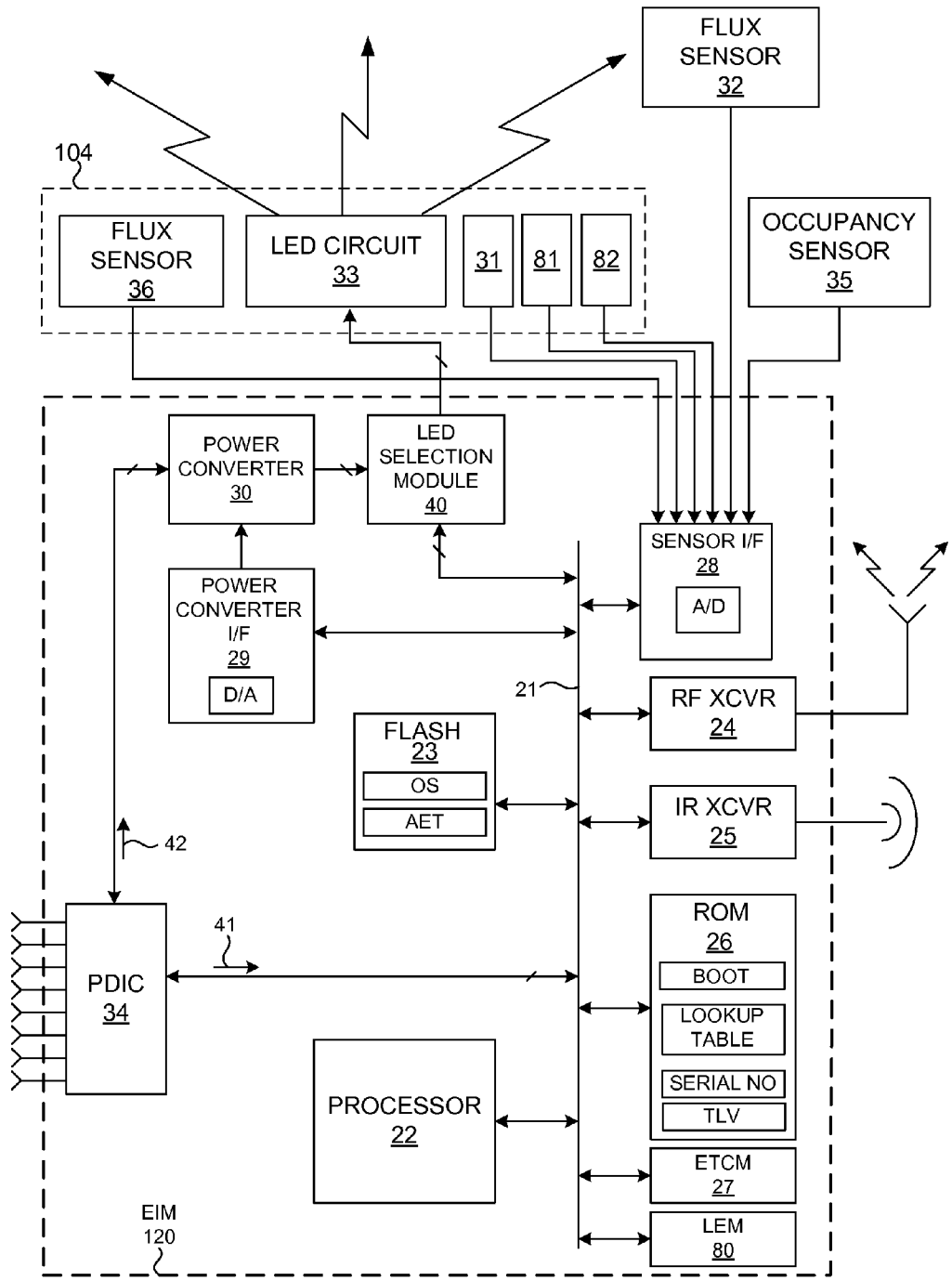
FIG. 10 is a schematic diagram illustrative of an electrical interface module that includes an elapsed time counter module.

As depicted in FIG. 10, EIM 120 may include an elapsed time counter module (ETCM) 27. At power-up of illumination module 100, an accumulated elapsed time (AET) stored in memory 23 is communicated to ETCM 27 and ETCM 27 begins counting time and incrementing the elapsed time. Periodically, a copy of the elapsed time is communicated and stored in memory 23 such that a current AET is stored in non-volatile memory at all times. In this manner, the current AET will not be lost when illumination module 100 is powered down unexpectedly. In some embodiments, processor 22 may include ETCM functionality on-chip. In some embodiments, EIM 120 stores a target lifetime value (TLV) that identifies the desired lifetime of illumination module 100. The target lifetime value may be stored in non-volatile memory 26 of EIM 120. A target lifetime value associated with a particular illumination module 100 is programmed into memory 26 during manufacture. In some examples, the target lifetime value may be selected to be the expected number of operating hours of illumination module 100 before a 30% degradation in luminous flux output of module 100 is expected to occur. In one example, the target lifetime value may be 50,000 hours.

Figure 34:
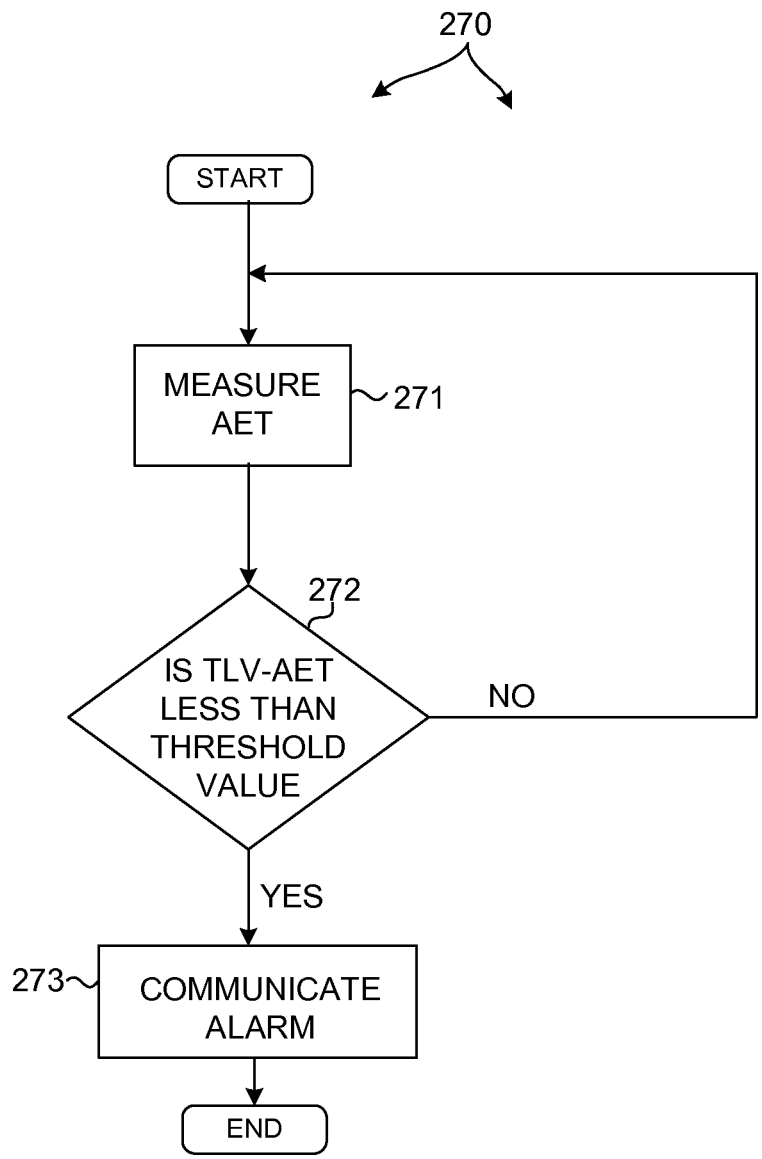
FIG. 34 illustrates a method of communicating whether the accumulated elapsed time of an LED based illumination module has reached a threshold value.

FIG. 34 illustrates a method 270 of communicating whether the AET of an LED based illumination module 100 has reached a threshold value. In a step 271, the AET of LED based illumination module 100 is measured. In some embodiments, ETCM 27 measures the AET. In a step 272, the AET is subtracted from the TLV value to determine whether the difference between the AET and the TLV has reached a threshold value. For example, a threshold value of 500 hours may be saved in memory 26. If the difference between the AET and TLV value has not reached the threshold value, the steps 271 and 272 are repeated. However, if the difference has reached the threshold value, an alarm is communicated (step 273). For example, is a threshold value of 500 hours is utilized and it is determined that the AET is within 500 hours of the TLV associated with LED based illumination module 100, an alarm is communicated. In some embodiments, the alarm indicates that a potential reduction in illumination performance (e.g., module shut down, performance degradation below acceptable limits, etc.) is looming. In some other embodiments, the alarm indicates action should be taken to avoid a fault or shutdown of the module. For example, the alarm may trigger a communication to the user to authorize additional lifetime before module 100 enters a fault mode or shutdown mode. In some embodiments, method 270 is executed by elements of EIM 120. In some other embodiments, portions of method 270 may be executed by a remote device that is communicatively coupled to LED based illumination module 100. In these embodiments, information needed to perform each step is communicated from LED based illumination module 100 to the remote device.

In some embodiments, processor 22 determines that the AET has reached or exceeded the TLV and communicates an alarm code over RF transceiver 24, IR transceiver 25, or PDIC 34. In other embodiments, EIM 120 may broadcast the alarm by controlling the light output from illumination device 100. For example, processor 22 may command the current supplied by power converter 30 to be periodically pulsed to indicate the alarm condition. The pulses may be detectable by humans, e.g., flashing the light output by illumination device 100 in a sequence of three, one second pulses every five minutes. The pulses may also be undetectable by humans, but detectable by a flux detector, e.g., pulsing the light output by illumination device 100 at one kilohertz. In these embodiments, the light output of illumination device 100 could be modulated to indicate an alarm code. In other embodiments, when the AET reaches the TLV, EIM 120 shuts down current supply to LED circuitry 33. In other embodiments, EIM 120 communicates the AET in response to receiving a request to transmit the AET. As depicted in FIG. 10, EIM 120 may also include lifetime estimation module (LEM) 80. In some embodiments, LEM 80 is a dedicated hardware module including memory and processing capability. In some other embodiments, processor 22 may include LEM functionality on-chip. In other embodiments, LEM 80 functionality may be achieved by processor 22 executing software instructions stored in memory (e.g., memory 23). LEM 80 estimates the elapsed lifetime of illumination module 100 based on the accumulated elapsed time (AET) of operation of the module and an overall cumulative acceleration factor ($CAF_{overall}$). $CAF_{overall}$ may be calculated by LEM 80 as a function of a number of operating factors including actual operating temperature, current, and humidity. By way of example, the calculation of $CAF_{overall}$ is described as including temperature, current, and humidity factors. However, any subset of these factors, or additional factors may be included in the calculation. The overall cumulative acceleration factor may be used to scale the accumulated elapsed time of module 100 to derive an estimate of the elapsed lifetime of module 100. Based on this result and the target lifetime value, an estimate of the remaining lifetime of module 100 can be calculated.

Figure 11:
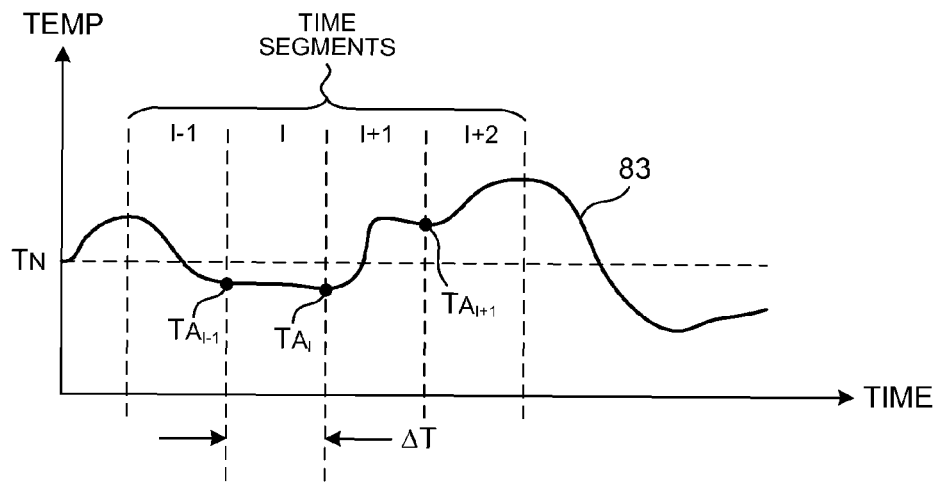
FIG. 11 illustrates an exemplary operating temperature profile as a function of time of illumination module.

FIG. 11 illustrates an exemplary operating temperature profile 83 as a function of time of illumination module 100. Also illustrated is a nominal temperature value, $T_N$. In one example, the nominal temperature is ninety degrees Centigrade. The nominal temperature is a temperature value of operation of module 100 for which the expected lifetime of the module is characterized. For example, if illumination module 100 is operated at a constant operating temperature of ninety degrees Centigrade, the operational lifetime of illumination module 100 is expected to be 50,000 hours. It is expected that after 50,000 hours of operation at an operating temperature of ninety degrees Centigrade, the performance of module 100 degrades to an unacceptable level. As illustrated in FIG. 11, there are periods of time when illumination module 100 operates at a temperature that exceeds $T_N$ and there are periods of time when illumination module 100 operates at a temperature below $T_N$. Because the lifetime of illumination module 100 depends on the operating temperature, it is expected that the operational lifetime of an illumination module 100 may be extended when the actual operating temperature is below $T_N$. Likewise, the operational lifetime may be reduced when the actual operating temperature is above $T_N$.

An estimate of an acceleration factor based on the actual operating temperature conditions may be calculated by LEM 80 from the Arrhenius equation.

$$AF_{temp} = e^{\frac{E_a}{k}\left(\frac{1}{T_N} - \frac{1}{T_A}\right)} \quad (1)$$

$E_a$ is the activation energy for the applicable failure mechanism. K is the Boltzmann constant equal to 8.617e-5 eV/K. $T_N$ is the nominal temperature in Kelvin for which the lifetime is characterized. These constants may be stored in memory 23 of EIM 120. $T_A$ is the actual operating temperature in Kelvin. Based on the actual operating temperature, an acceleration factor may be calculated by LEM 80 that is useable to scale the AET of a module. The AET of illumination module 100 may be subdivided into a number of time segments each of duration $\Delta T$. Time segments may be any suitable length of time. In one example, the duration of the time segments may be one hour. For each time segment a representative value for actual operating temperature may be calculated. As illustrated, a representative value for operating temperature, $T_{Ai}$, over time segment, i, may be calculated. In one example, $T_{Ai}$ may be calculated as an average temperature value over the time segment. In another example, a median temperature value may be calculated. In another example, a minimum, or alternatively, a maximum value of temperature over the time segment may be used as the representative value of the operating temperature over the time segment. In yet another example, the temperature value at the beginning, or alternatively, the end of the time segment may be used as the representative value. FIG. 11 illustrates the case where the temperature value at the end of the time segment is used as the representative value. Based on the representative value, LEM 80 calculates the incremental acceleration factor for time segment, i, as follows:

$$(AF_{temp})_i = e^{\frac{E_a}{k}\left(\frac{1}{T_N} - \frac{1}{T_{A_i}}\right)} \tag{2}$$

The incremental acceleration factor due to temperature over time segment, i, is useable to scale the elapsed time, $\Delta T$, of time segment, i, to obtain an estimate of the amount by which the lifetime of module 100 has been changed due to temperature conditions over time segment, i.

To estimate how the operating lifetime of module 100 has been changed due to temperature conditions over its accumulated operational life, a cumulative acceleration factor is calculated by LEM 80. A cumulative acceleration factor may be calculated as a rolling average of the acceleration factors calculated over the accumulated time segments. For example, the cumulative acceleration factor after time segment, i, has elapsed is calculated as:

$$(CAF_{temp})_i = \frac{(i-1)(CAF_{temp})_{i-1} + AF_{temp_i}}{i} \tag{3}$$

The cumulative acceleration factor due to temperature evaluated through time segment, i, is useable to estimate the amount by which the accumulated operational lifetime of module 100 has been changed due to temperature conditions over its life through time segment, i.

Figure 12:
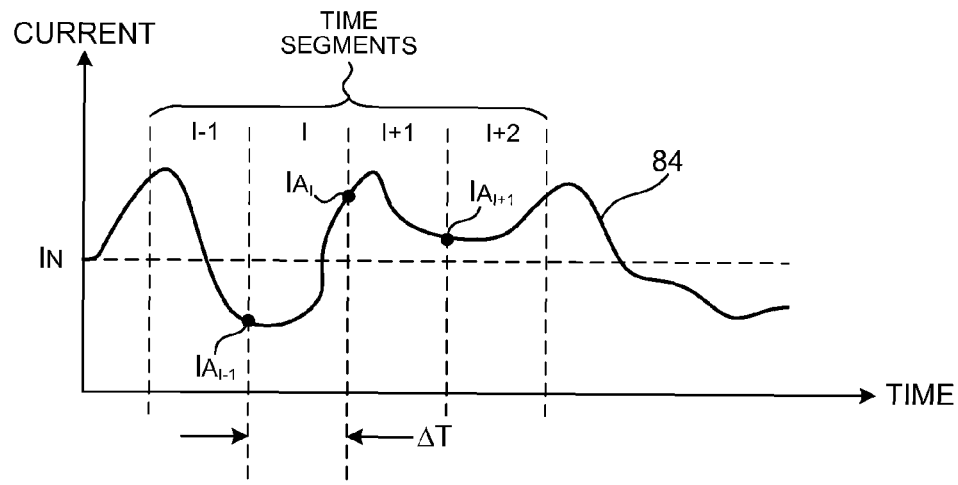
FIG. 12 illustrates an exemplary operating current profile over time for illumination module.

FIG. 12 illustrates an exemplary operating current profile 84 over time of illumination module 100. Also illustrated is a nominal current value, $I_N$. In one example, the nominal current is 0.7 Ampere. The nominal current is an operating current value for which the expected lifetime of a module is characterized. For example, if illumination module 100 is operated at a constant current of 0.7 Ampere, the operational lifetime of illumination module 100 is expected to be 50,000 hours. It is expected that after 50,000 hours of operation at 0.7 Ampere, the performance of module 100 degrades to an unacceptable level. As illustrated in FIG. 12, there are periods of time when illumination module 100 operates at a current that exceeds $I_N$ and there are periods of time when illumination module 100 operates at a current below $I_N$. Because the lifetime of illumination module 100 depends on the operating current, it is expected that the operational lifetime of an illumination module 100 may be extended when the actual operating current is below $I_N$. Likewise, the operational lifetime may be reduced when the actual operating current is above $I_N$. An acceleration factor may be used to scale the operational lifetime of an illumination module to derive an estimate of the elapsed lifetime of a module.

An estimate of an acceleration factor based on the actual operating current may be calculated as follows:

$$AF_{current} = e^{\beta(I_A - I_N)} \tag{4}$$

$\beta$ is an experimentally derived constant parameter. $I_N$ is the nominal operating current in Ampere for which the lifetime is known. These constants may be stored in memory 23 of EIM 120. $I_A$ is the actual operating current in Ampere. Based on the actual operating current, LEM 80 calculates an acceleration factor that is useable to scale the AET of module 100. The AET of illumination module 100 may be subdivided into a number of time segments each of duration $\Delta T$. For each time segment a representative value for actual operating current may be calculated by LEM 80. For example, a representative value for operating current, $I_{Ai}$ over time segment, i, may be calculated. In one example, $I_{Ai}$ may be calculated as an average current value over the time segment. In another example, a median current value may be calculated. In another example, a minimum, or alternatively, a maximum value of current over the time segment may be used as the representative value of the operating current over the time segment. In yet another example, the current value at the beginning, or alternatively, the end of the time segment may be used as the representative value. FIG. 12 illustrates the case where the current value at the end of the time segment is used as the representative value. Based on the representative value, LEM 80 calculates the acceleration factor for time segment, i, as follows:

$$(AF_{current})_i = e^{\beta(I_A - I_N)} \tag{5}$$

The incremental acceleration factor due to current over time segment, i, is useable to scale the elapsed time, $\Delta T$, of time segment, i, to obtain an estimate of the amount by which the lifetime of module 100 has been changed due to current conditions over time segment, i.

To estimate how the operating lifetime of module 100 has been changed due to actual operating current over its accumulated operational life, a cumulative acceleration factor is calculated by LEM 80. A cumulative acceleration factor may be calculated by LEM 80 as a rolling average of the acceleration factors calculated over the accumulated time segments. For example, the cumulative acceleration factor after time segment i has elapsed is calculated as:

$$(CAF_{current})_i = \frac{(i-1)(CAF_{current})_{i-1} + (AF_{current})_i}{i} \tag{6}$$

The cumulative acceleration factor due to current evaluated through time segment, i, is useable to estimate the amount by which the accumulated operational lifetime of module 100 has been changed due to current conditions over its life through time segment, i.

Figure 13:
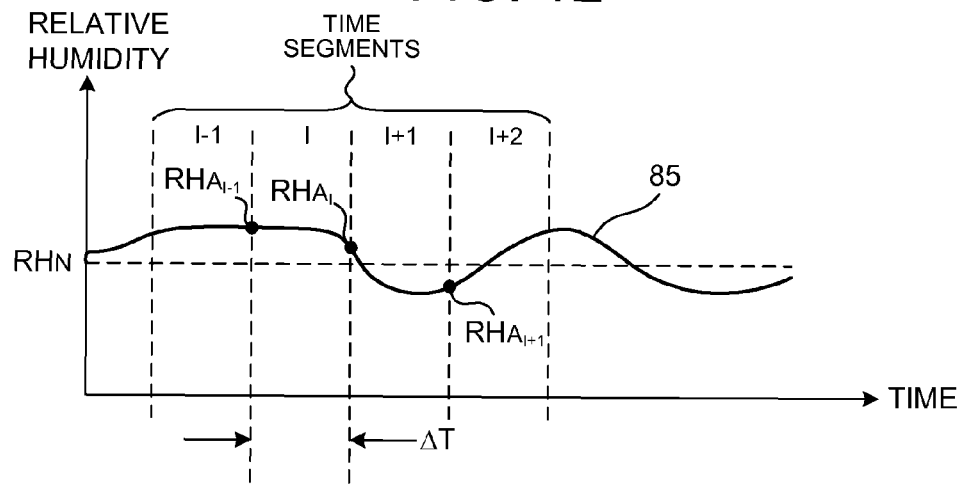
FIG. 13 illustrates an exemplary operating relative humidity profile over time for illumination module.

FIG. 13 illustrates an exemplary operating relative humidity profile 85 over time of illumination module 100. Also illustrated is a nominal relative humidity value, $RH_N$. In one example, the nominal relative humidity is 0.5. The nominal relative humidity is an operating value for which the expected lifetime of a module is characterized. For example, if illumination module 100 is operated at a constant relative humidity of 0.5, the operational lifetime of illumination module 100 is expected to be 50,000 hours. It is expected that after 50,000 hours of operation at a relative humidity index of 0.5, the performance of module 100 degrades to an unacceptable level. As illustrated in FIG. 13, there are periods of time when illumination module 100 operates at a relative humidity index that exceeds $RH_N$ and there are periods of time when illumination module 100 operates at a current below $RH_N$. Because the lifetime of illumination module 100 depends on the operating relative humidity, it is expected that the operational lifetime of an illumination module 100 may be extended when the actual operating current is below $RH_N$, and likewise, the operational lifetime may be reduced when the actual operating current is above $RH_N$. An acceleration factor may be used to scale the operational lifetime of an illumination module to derive an estimate of the elapsed lifetime of a module.

An estimate of an acceleration factor based on the actual operating relative humidity may be calculated as follows:

$$AF_{humidity} = \left(\frac{RH_A}{RH_N}\right)^3 \quad (7)$$

$RH_A$ is the actual relative humidity. $RH_N$ is the nominal relative humidity for which the lifetime is known. $RH_N$ may be stored in memory 23 of EIM 120. Based on the actual relative humidity, an acceleration factor for relative humidity may be calculated by LEM 80. In an analogous manner as discussed above with respect to temperature and current, LEM 80 uses a representative value of the actual relative humidity to calculate the acceleration factor for time segment, i.

$$(AF_{humidity})_i = \left(\frac{RH_{A_i}}{RH_N}\right)^3 \quad (8)$$

Similarly, as discussed above, a cumulative acceleration factor may be calculated by LEM 80 as:

$$(CAF_{humidity})_i = \frac{(i-1)(CAF_{humidity})_{i-1} + (AF_{humidity})_i}{i} \quad (9)$$

The cumulative acceleration factor due to relative humidity evaluated through time segment, i, is useable to estimate the amount by which the accumulated operational lifetime of module 100 has been changed due to humidity conditions over its life through time segment, i.

An overall acceleration factor may be calculated as the product of the calculated acceleration factors associated with each operating variable. For example, an overall acceleration factor accounting for actual operating temperature, current, and relative humidity over time increment, $\Delta T_i$, is expressed as:

$$(AF_{overall})_i = (AF_{temp})_i * (AF_{current})_i * (AF_{humidity})_i \quad (10)$$

Similarly, the overall cumulative acceleration factor through time increment, $\Delta T_i$, may be calculated by LEM 80 as:

$$(CAF_{overall})_i = (CAF_{temp})_i * (CAF_{current})_i * (CAF_{humidity})_i \quad (11)$$

The elapsed lifetime of an illumination module may be estimated by multiplying the overall cumulative acceleration factor by the accumulated elapsed time of the module.

$$L_E = (CAF_{overall})_i * AET \quad (12)$$

Thus, if the acceleration factor is less than unity, the accumulated elapsed time of the module is scaled back. If the acceleration factor is greater than unity, the accumulated elapsed time of the module is scaled forward. If the acceleration factor is unity, estimated elapsed lifetime is the same as the accumulated elapsed time of the module.

An estimate of the remaining lifetime of module 100 may be calculated by taking the difference between the Target Lifetime Value (TLV) and the estimated elapsed lifetime of the module.

$$L_R = TLV - L_E \quad (13)$$

The accumulated elapsed time and the remaining lifetime calculated by LEM 80 are stored in memory 23 of EIM 120. In one embodiment, the values may be communicated to devices communicatively linked to EIM 120 in response to a request received by EIM 120. In another embodiment, if the remaining lifetime estimate falls below a threshold value, EIM 120 communicates an alarm.

Figure 14:
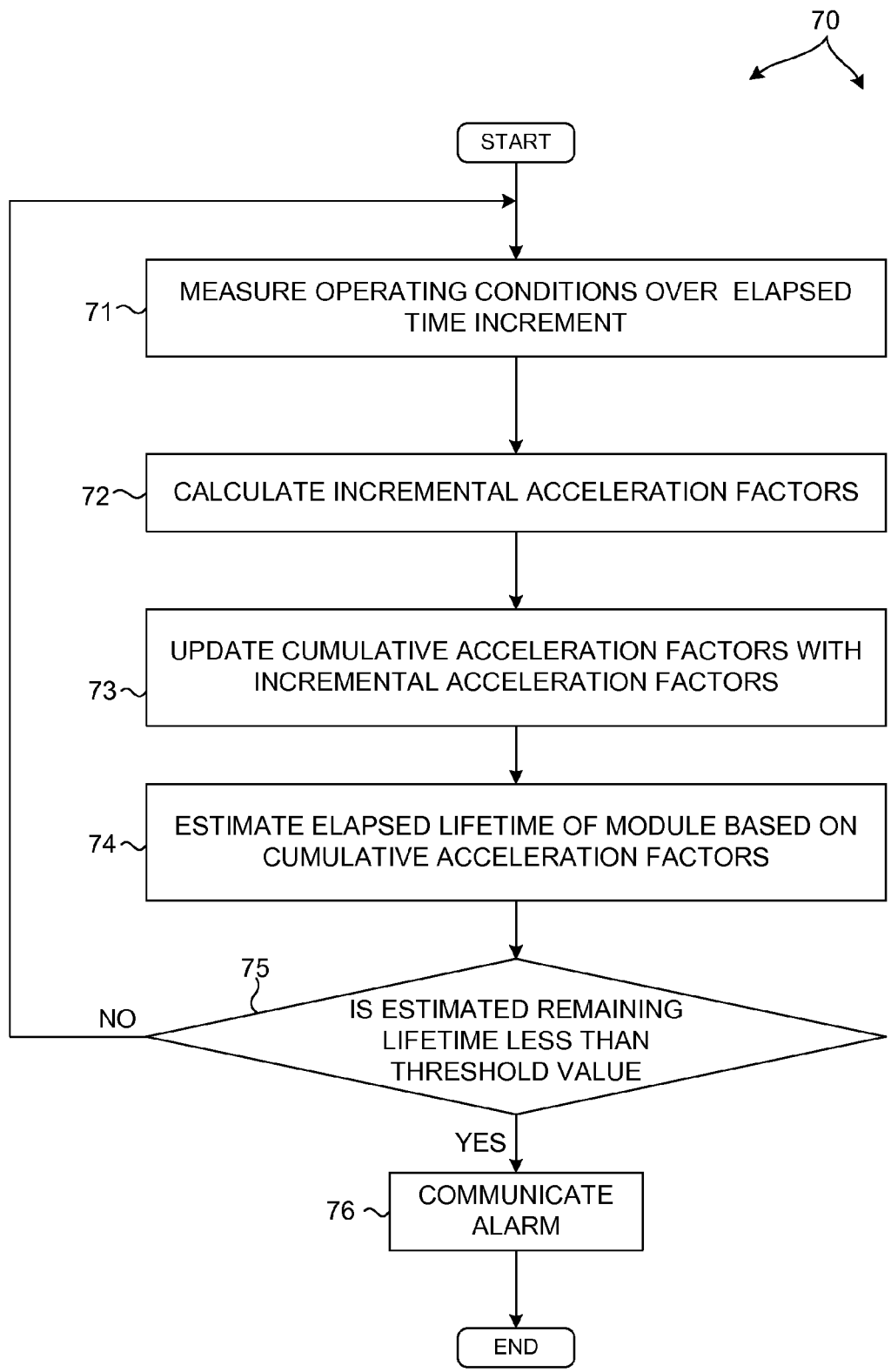
FIG. 14 is illustrative of a method of estimating the lifetime of an LED-based illumination module based on actual operating conditions.

FIG. 14 is illustrative of a method 70 of estimating the lifetime of an LED-based illumination module based on actual operating conditions. In a first step (step 71), one or more operating conditions (e.g., temperature, current, relative humidity) are measured over a time increment. In a second step (step 72) incremental acceleration factors associated with each operating condition are calculated based on the measured operating conditions. In a third step (step 73) cumulative acceleration factors associated with each operating condition are calculated based on the incremental acceleration factors. In a fourth step (step 74) the elapsed lifetime of module 100 is estimated based on the cumulative acceleration factors. In a fifth step (step 75) the estimated remaining lifetime of module 100 is compared with a threshold value associated with module 100. If the estimated remaining lifetime falls below the threshold value, an alarm is communicated from module 100 (step 76).

Figure 35:
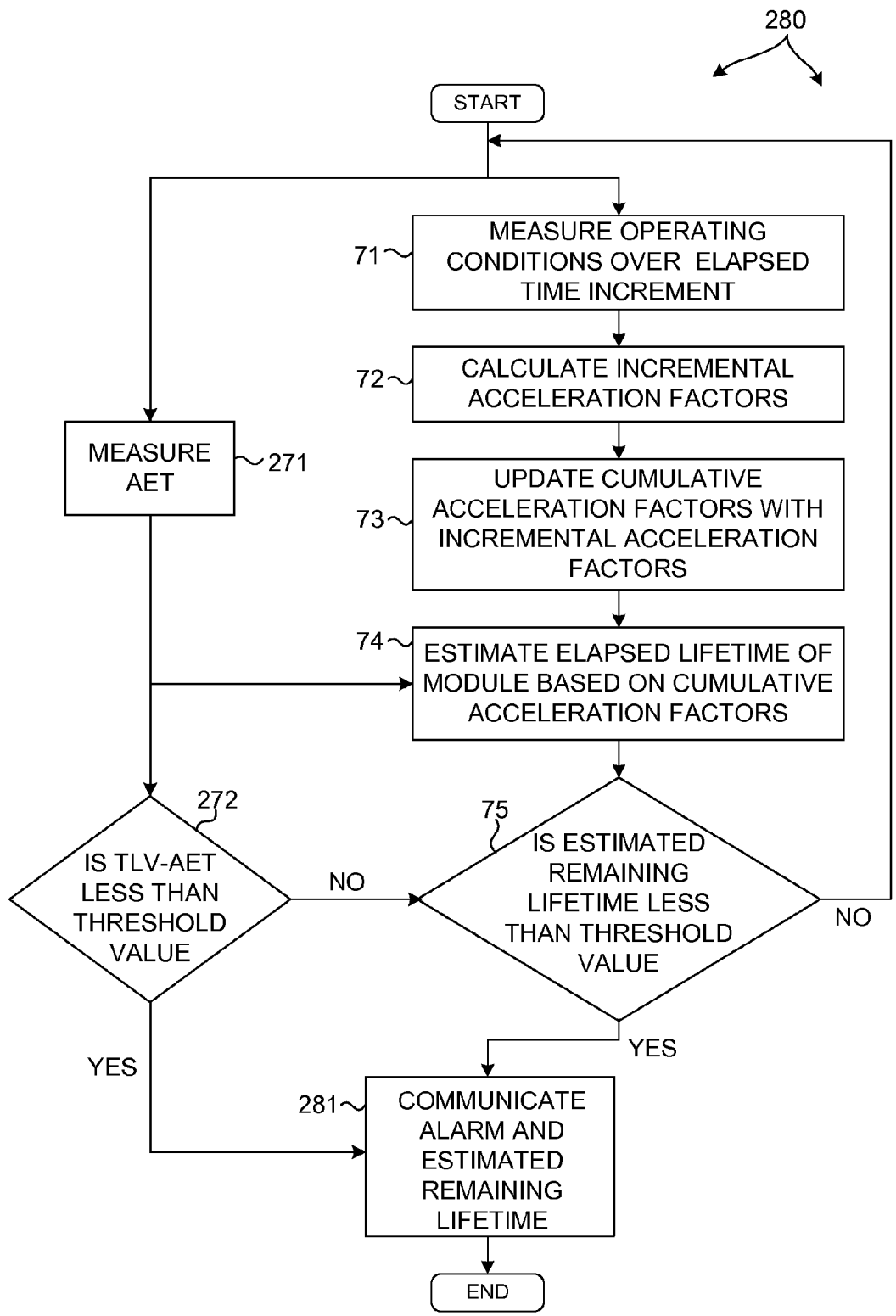
FIG. 35 is illustrative of an exemplary method of communicating an alert that indicates the estimated remaining lifetime of LED based illumination module.

FIG. 35 is illustrative of an exemplary method 280 of communicating an alert that indicates the estimated remaining lifetime of LED based illumination module 100. In accordance with the method 280, the AET of LED based illumination module 100 is determined (step 271) and the AET is subtracted from the TLV value to determine whether the difference between the AET and the TLV has reached a threshold value. In parallel, it is determined whether the estimated remaining lifetime has fallen below the threshold value as discussed with respect to method 70 (steps 71-75). If either the difference between the AET and the TLV has reached a threshold value or the estimated remaining lifetime has reached a threshold value, both an alarm and the estimated remaining lifetime is communicated from module 100 (step 281). In this manner, an entity receiving this information knows that action needs to be taken to address the future illumination performance of LED based illumination module 100 and also knows an estimate of how much additional lifetime may be available from module 100.

Figure 15:
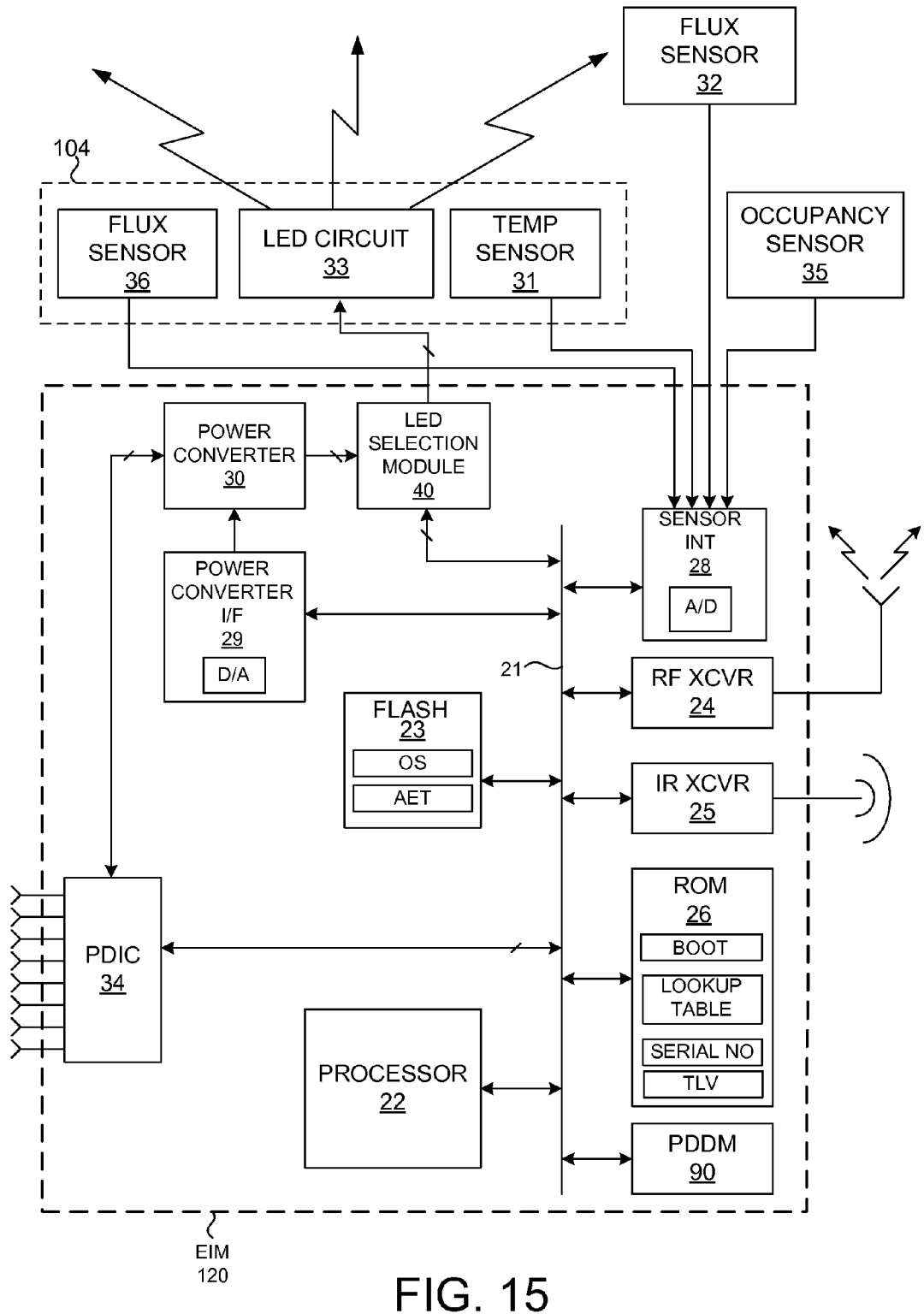
FIG. 15 is a schematic diagram illustrative of an electrical interface module that includes a phosphor degradation detection module.

As depicted in FIG. 15, EIM 120 may also include phosphor degradation detection module (PDDM) 90. In some embodiments, PDDM 90 is a dedicated hardware module including memory and processing capability. In some other embodiments, processor 22 may include PDDM functionality on-chip. In other embodiments, PDDM functionality may be achieved by processor 22 executing software instructions stored in memory (e.g., memory 23). PDDM 90 estimates the degradation of phosphors included in cavity 109 of illumination module 100 based on the flux intensity response of module 100 to a pulse of light emitted from LEDs 102.

Figure 16:
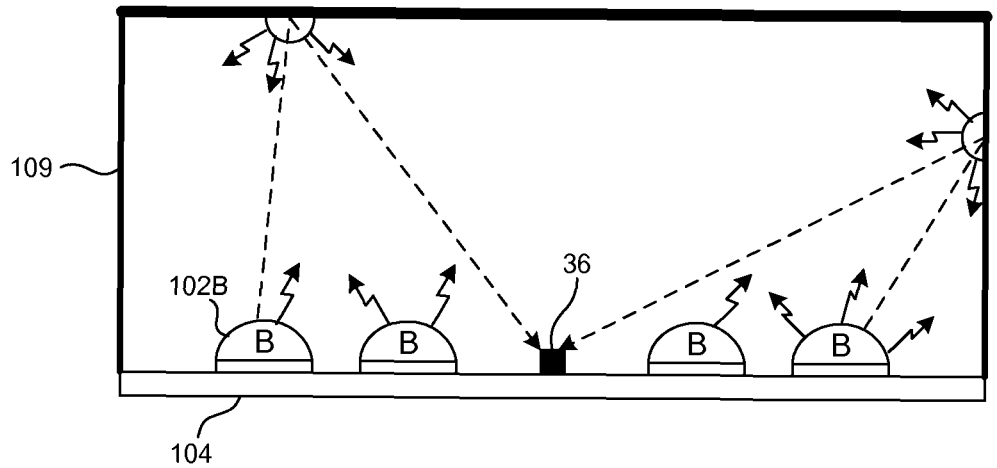
FIG. 16 illustrates a cut-away view of primary mixing cavity including blue LEDs and a flux sensor mounted to a mounting board.

FIG. 16 illustrates a cut-away view of primary mixing cavity 109 including blue LEDs 102B and flux sensor 36 mounted to mounting board 104. In one embodiment, flux sensor 36 is a silicon diode. In other embodiments, flux sensor 36 may be mounted in any position suitable to capture light emitted from cavity 109 (e.g., on walls of cavity 109, on output window 108, and above output window 108). LEDs 102B are pulsed on over a period of time. For example a pulse of 50 milliseconds may be implemented.

Figure 17:
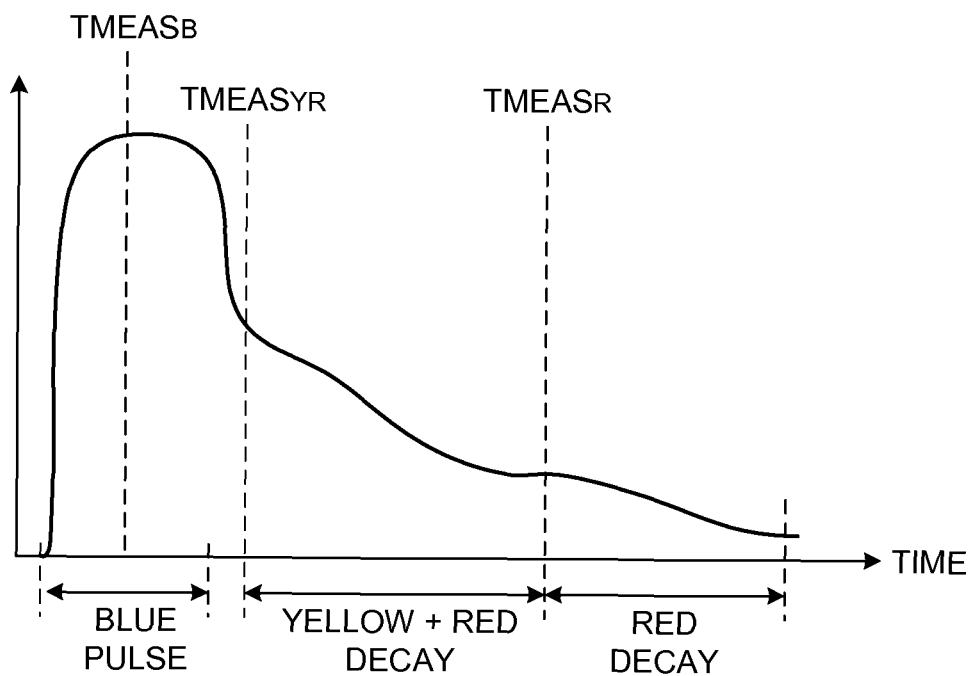
FIG. 17 illustrates an exemplary flux intensity response to a pulse of light emitted from LEDs measured by a flux sensor.

FIG. 17 illustrates an exemplary flux intensity response to a pulse of light emitted from LEDs 102B measured by flux sensor 36. Three periods of time are illustrated. A first period of time is the duration of the pulse of light emitted from LEDs 102B. During this period the flux intensity reaches a peak value as the cavity is filled with light. PDDM 90 is operable to capture the peak value of flux intensity during the first period of time. The captured value is a measure of the flux intensity of LEDs 102 during operation and is useful to diagnose the condition of LEDs 102. For example, if the captured value is below a target value, degradation of LED 102 may be detected.

The second period of time begins after the pulse of light from LEDs 102B is completed. The second period of time approximates the period of time of the response when both a yellow and a red phosphor emit converted light in response to the light previously emitted by LEDs 102B. In general, the response of phosphors to incoming light is not instantaneous. Thus, for a period of time after incident light is removed phosphor materials continue to emit converted light. The degree to which different phosphor materials continue to fluoresce after the incident light source is removed varies with material. PDDM 90 exploits this characteristic to separately diagnose different phosphors within cavity 109. In the illustrated example, the period of time following the pulse of light emitted from LEDs 102B includes a period of emission of both yellow and red phosphors of cavity 109. Thus, following the removal of the excitation from LEDs 102B, PDDM 90 measures the flux intensity of the residual emission of both the red and yellow phosphor materials. Because the excitation source is removed, the flux intensity level of the emission during this period declines steadily. By the end of the second period of time, the emission from the yellow phosphor has decayed to a negligible level and the measured flux intensity is primarily due to emission from the red phosphor material. At this moment PDDM 90 measures the flux intensity from the residual emission of the red phosphor material. After the second time period, a third time period elapses. The third period of time approximates the period of time of the response when the red phosphor emits converted light in response to the light previously emitted by LEDs 102B. By way of example, the second period of time is less than ten milliseconds.

FIG. 17 illustrates points in time when PDDM 90 measures the peak flux intensity to characterize LEDs 102B, the flux intensity generated by emission of both a yellow and a red phosphor, and the flux intensity generated primarily by emission of a red phosphor. For example, at $T_{measB}$ a measurement of the flux intensity of LEDs 102B is made. The timing of $T_{measB}$ may be fixed with respect to the pulse of LEDs 102. For example, $T_{measB}$, may be measured 25 milliseconds after the pulse of LEDs 102 begins. In another example, $T_{measB}$, may be measured in the middle of the pulse duration. Any point in time during the pulse of LEDs 102 may be suitable for the measurement of the flux intensity of LEDs 102. In another example, $T_{measB}$, may be selected to correspond with the time when the flux response reaches a peak value during the excitation period. In this example, PDDM 90 executes a peak detection algorithm over the excitation time period and identifies the peak value of flux intensity during the excitation time period. At $T_{measYR}$ a measurement of the flux intensity of the response of the yellow and red phosphors is made. The timing of $T_{measYR}$ may be fixed with respect to the pulse of LEDs 102. For example, PDDM 90 may measure the flux intensity of the response of the yellow and red phosphors one millisecond after the pulse of LEDs 102B ends. This may be a suitable value to allow time for flux sensor 36 to respond to the sudden elimination of the excitation of LEDs 102B, but is not such a long period that a substantial portion of yellow and red phosphor emission is missed. At $T_{measR}$ a measurement of the flux intensity of the response of the red phosphor is made. The timing of $T_{measR}$ may be fixed with respect to the pulse of LEDs 102. For example, PDDM 90 may measure the flux intensity of the response of the red phosphor 10 milliseconds after the pulse of LEDs 102B ends. This may be a suitable value to allow time for a substantial portion of yellow phosphor emission to occur, but is not such a long period that a substantial portion of red phosphor emission is missed. The flux intensity values measured by PDDM 90 at $T_{measB}$, $T_{measYR}$, and $T_{measR}$ may be stored in memory 23 of EIM 120. In one embodiment, the values may be communicated to devices communicatively linked to EIM 120 in response to a request received by EIM 120. In another embodiment, if any of the measured values falls below a respective threshold value, EIM 120 communicates an alarm. In addition, flux intensity values may be measured repeatedly over time and the result stored in memory 23. The resulting values may be used to benchmark the performance of module 100 over the lifetime of the module and establish trends useable to estimate the remaining lifetime of module 100.

Figure 18:
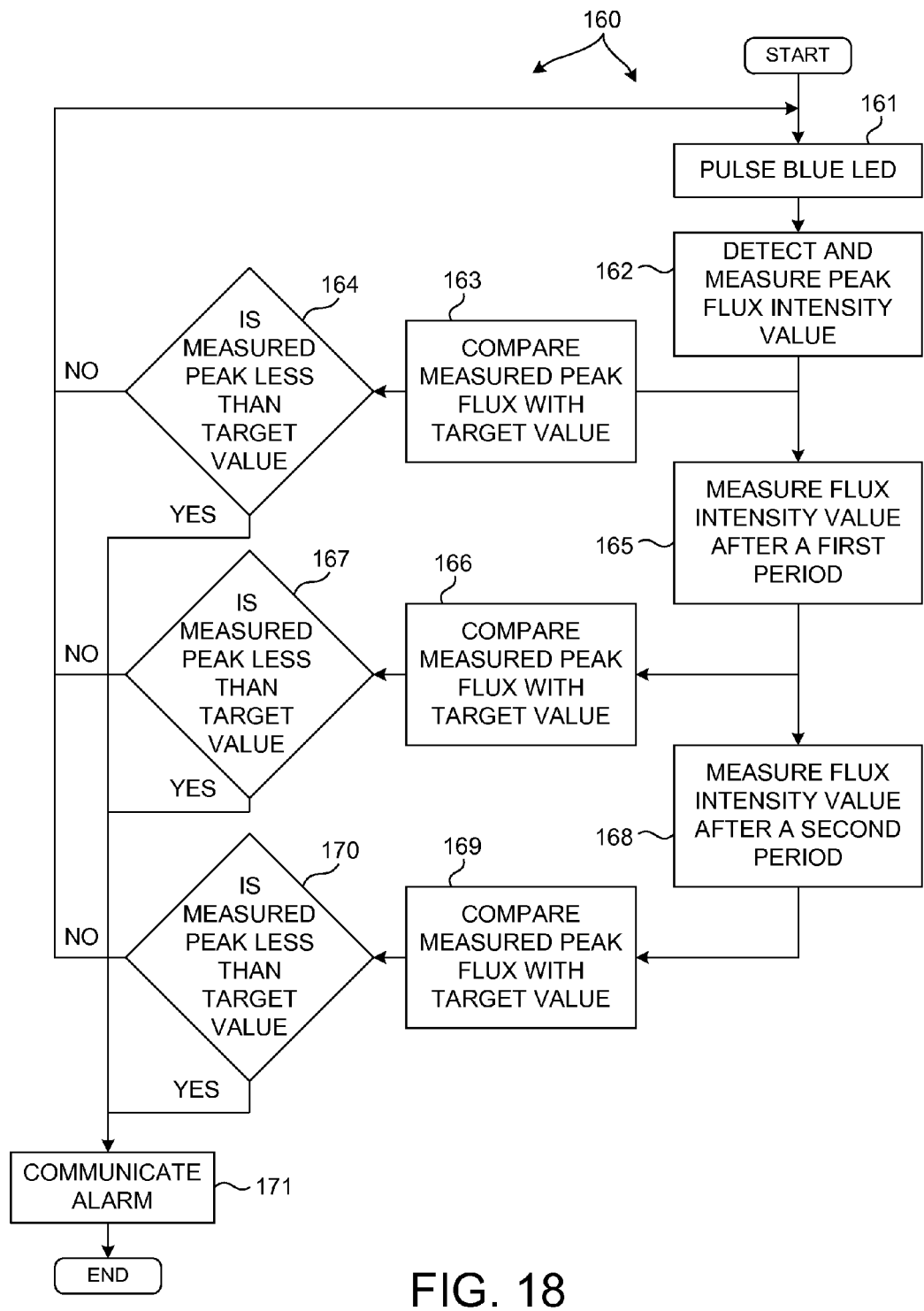
FIG. 18 illustrates an exemplary method of estimating the degradation of phosphors included in cavity of the illumination module based on the flux intensity response of module to a pulse of light emitted from LEDs.

FIG. 18 illustrates an exemplary method 160 of estimating the degradation of phosphors included in cavity 109 of illumination module 100 based on the flux intensity response of module 100 to a pulse of light emitted from LEDs 102. In a first step (step 161) a blue LED of module 100 is pulsed for a period of time. In a second step (step 162) the peak flux intensity value is detected and measured during the blue LED pulse. In a third step (step 165) the peak flux intensity value is measured at a first point in time after the blue LED pulse is complete. In a fourth step (step 168) the peak flux intensity value is measured at a second point in time after the blue pulse is complete. For each of the second (step 162), third (step 165), and fourth (step 168) steps, the measured peak flux value is compared with a target value (steps 163, 166, and 169, respectively). If a measured peak value falls below the target value in any of the cases (steps 164, 167, and 170, respectively), module 100 communicates an alarm (step 171).

Figure 19:
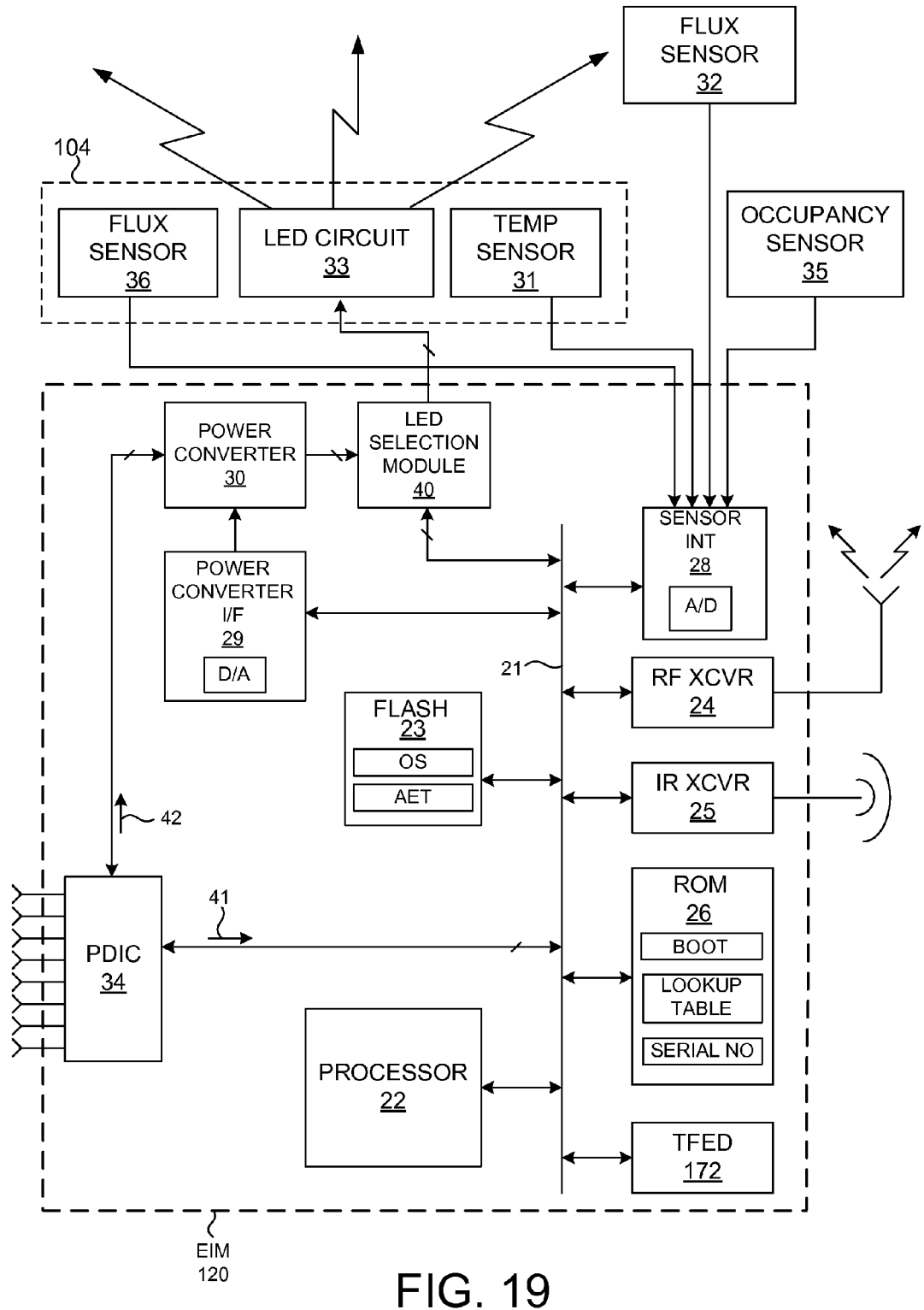
FIG. 19 is a schematic diagram illustrative of an electrical interface module that includes a Thermal Failure Early Detection module.

As depicted in FIG. 19, EIM 120 may also include Thermal Failure Early Detection module (TFED) 172. In some embodiments, TFED 172 is a dedicated hardware module including memory and processing capability. In some other embodiments, processor 22 may include TFED functionality on-chip. In other embodiments, TFED functionality may be achieved by processor 22 executing software instructions stored in memory (e.g., memory 23). In one embodiment, TFED 172 estimates the potential for thermal failure of luminaire 150 based on a temperature transient measured during start-up of module 100. Based on the measured transient, TFED 172 estimates whether module 100 will reach a steady state operating temperature that exceeds the rated operating temperature. The estimation is made before the module actually reaches an over-temperature condition, thus reducing the risk of permanent damage to the module. In another embodiment, TFED 172 estimates the potential for thermal failure of luminaire 150 based on a flux transient measured during start-up of module 100. Based on the measured transient, TFED 172 estimates whether module 100 will reach a steady state operating temperature that exceeds the rated operating temperature. The estimation is made before the module actually reaches an over-temperature condition, thus reducing the risk of permanent damage to the module.

Figure 20:
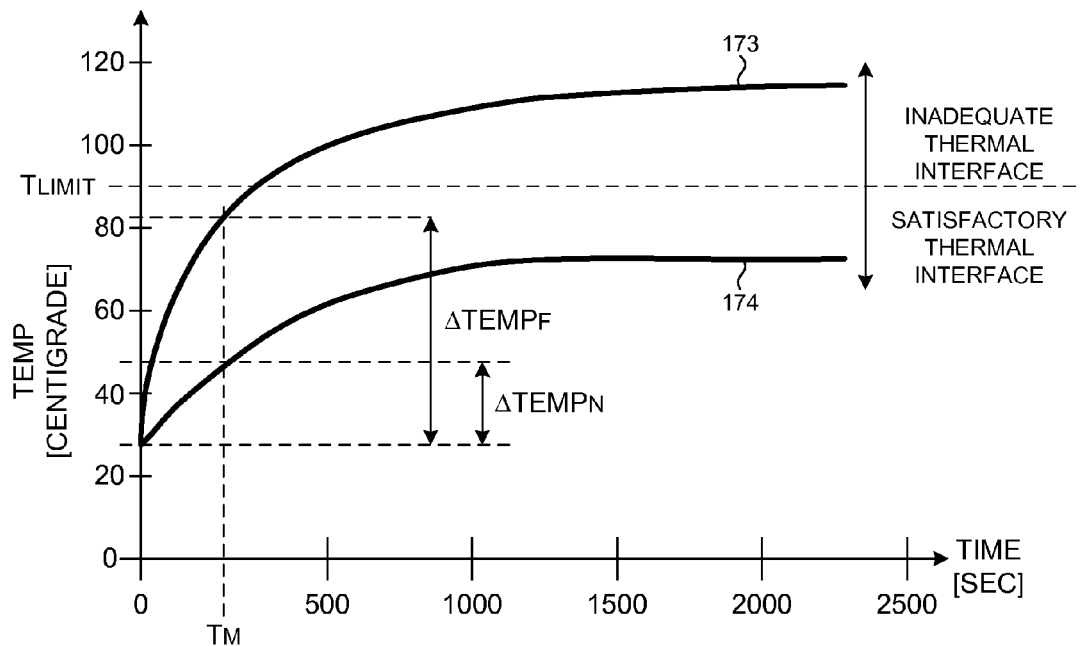
FIG. 20 illustrates two exemplary measured temperature profiles.

FIG. 20 illustrates two measured temperature profiles. Temperature profile 174 is a measurement of the temperature of the module 100 at mounting base 101 for the case where module 100 is tightly coupled to heat sink 130 with thermally conductive paste. Module 100 begins start-up at room temperature and rises in temperature to approximately seventy degrees Centigrade. This is below the rated temperature limit of module 100 of ninety degrees Centigrade. Temperature profile 173 is a measurement of the temperature of the module 100 at mounting base 101 for the case where module 100 is loosely coupled to heat sink 130 without thermally conductive paste. Module 100 begins start-up at room temperature and rapidly rises in temperature to nearly 120 degrees Centigrade. This far exceeds the rated temperature limit of module 100 of ninety degrees Centigrade. In addition, operation of module 100 above ninety degrees Centigrade risks permanent damage to the module. TFED 172 operates to estimate whether module 100 will reach steady-state temperature beyond the rated limit without the need to actually operate module 100 beyond the limit.

As depicted in FIG. 20, by way of example, TFED 172 measures the temperature of module 100 at room temperature conditions at start up and again two hundred seconds after start-up. Although two hundred seconds is illustrated as the point in time of evaluation of temperature, other periods of time may be considered. For example, temperature may be evaluated within ten seconds of illumination of module 100. Such a period of time may be suitable in a factory environment where minimizing test time is desirable and it is desirable to identify fixture failures before the product is shipped to customers. In another example, the measurement may be made at the installation of luminaire 150 to test the performance of the luminaire in the installed environment. In the first case, TFED 172 calculates the difference in temperature, $\Delta TEMP_N$, between the temperature of module 100 at start up and the temperature of module 100 after 200 seconds have elapsed. This difference is approximately twenty one degrees Centigrade. TFED 172 calculates whether the difference $\Delta TEMP_N$, is below a predetermined threshold, $\Delta T_{THRS}$. For example, $\Delta T_{THRS}$ may be 25 degrees Centigrade. In this case, $\Delta TEMP_N$ does not exceed $\Delta T_{THRS}$ and TFED 172 concludes that module 100 is not at risk for thermal failure under the conditions of this case. In the second case, TFED 172 calculates the difference in temperature, $\Delta TEMP_F$, between the temperature of module 100 at start up and the temperature of module 100 after 200 seconds have elapsed. This difference is approximately fifty five degrees Centigrade. TFED 172 calculates whether the difference $\Delta TEMP_F$, is below a predetermined threshold, $\Delta T_{THRS}$. In this case, $\Delta TEMP_F$ exceeds $\Delta T_{THRS}$ and TFED 172 concludes that module 100 is at risk for thermal failure under the conditions of this case. The values measured by TFED 172 (e.g., $\Delta TEMP$) may be stored in memory 23 of EIM 120. In one embodiment, the values may be communicated to devices communicatively linked to EIM 120 in response to a request received by EIM 120. In another embodiment, if any of the measured values exceed the predetermined threshold value, EIM 120 communicates an alarm.

Because the temperature of module 100 also impacts the flux output of module 100, TFED 172 may also estimate whether module 100 will reach a steady state operating temperature that exceeds the rated limit based on a measurement of the flux transient measured during start-up.

Figure 21:
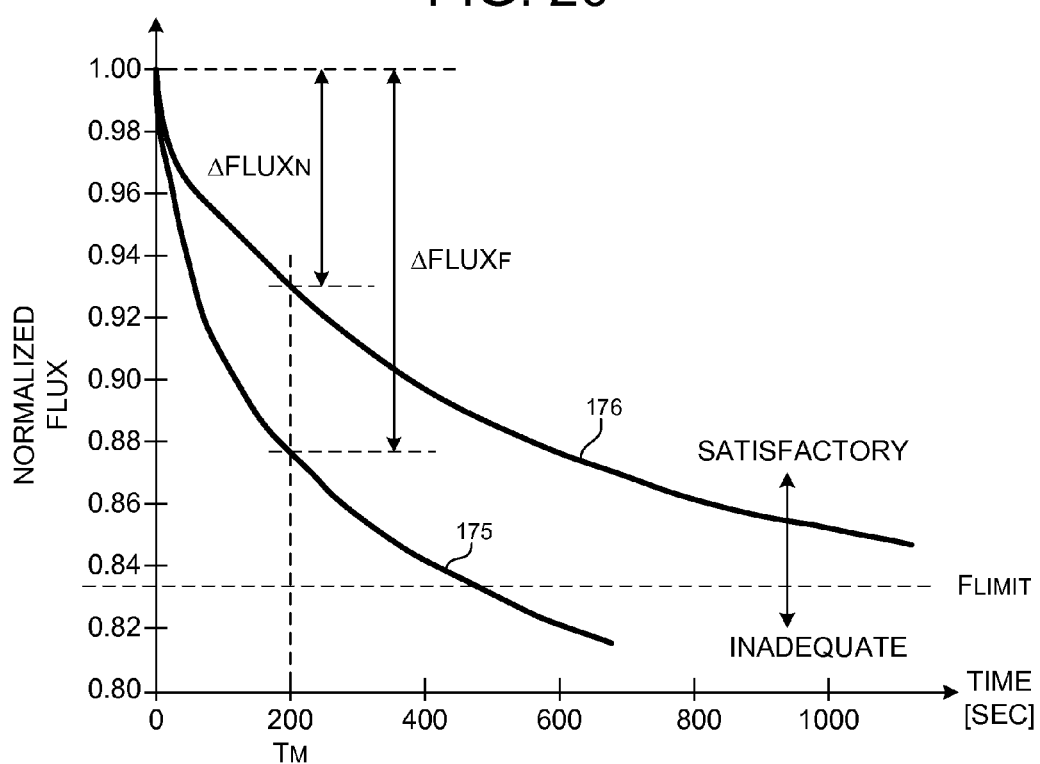
FIG. 21 illustrates two exemplary measured flux profiles.

FIG. 21 illustrates two measured flux profiles. Flux profile 176 is a measurement of the flux of the module 100 at mounting base 101 for the case where module 100 is tightly coupled to heat sink 130 with thermally conductive paste. Module 100 begins start-up at a normalized flux level of one at room temperature and degrades in flux to approximately 0.93 normalized flux at 200 seconds. Flux profile 175 is a measurement of the flux of the module 100 at mounting base 101 for the case where module 100 is loosely coupled to heat sink 130 without thermally conductive paste. Module 100 begins start-up at normalized flux level of one and rapidly declines in flux to 0.88 normalized flux at 200 seconds. TFED 172 operates to estimate whether module 100 will operate in steady-state beyond the rated temperature limit without the need to actually operate module 100 until rated temperature limits are exceeded using the flux transient as an indicator.

As depicted in FIG. 21 by way of example, TFED 172 measures the flux of module 100 at room temperature conditions at start up and again two hundred seconds after start-up from room temperature conditions. In the first case, TFED 172 calculates the difference in flux, $\Delta FLUX_N$, between the flux of module 100 at start up and the flux of module 100 after 200 seconds have elapsed. This difference is approximately 0.07. TFED 172 calculates whether the difference $\Delta FLUX_N$, is below a predetermined threshold, $\Delta F_{THRS}$. For example, $\Delta F_{THRS}$ may be 0.09. In this case, $\Delta FLUX_N$ does not exceed $\Delta F_{THRS}$ and TFED 172 concludes that module 100 is not at risk for thermal failure under the conditions of this case. In the second case, TFED 172 calculates the difference in flux, $\Delta FLUX_F$, between the flux of module 100 at start up and the flux of module 100 after 200 seconds have elapsed. This difference is approximately 0.12. TFED 172 calculates whether the difference $\Delta FLUX_F$, is below a predetermined threshold, $\Delta F_{THRS}$. In this case, $\Delta FLUX_F$ exceeds $\Delta T_{THRS}$ and TFED 172 concludes that module 100 is at risk for thermal failure under the conditions of this case. The values measured by TFED 172 (e.g., $\Delta FLUX$) may be stored in memory 23 of EIM 120. In one embodiment, the values may be communicated to devices communicatively linked to EIM 120 in response to a request received by EIM 120. In another embodiment, if any of the measured values exceed the predetermined threshold value, EIM 120 communicates an alarm.

Figure 22:
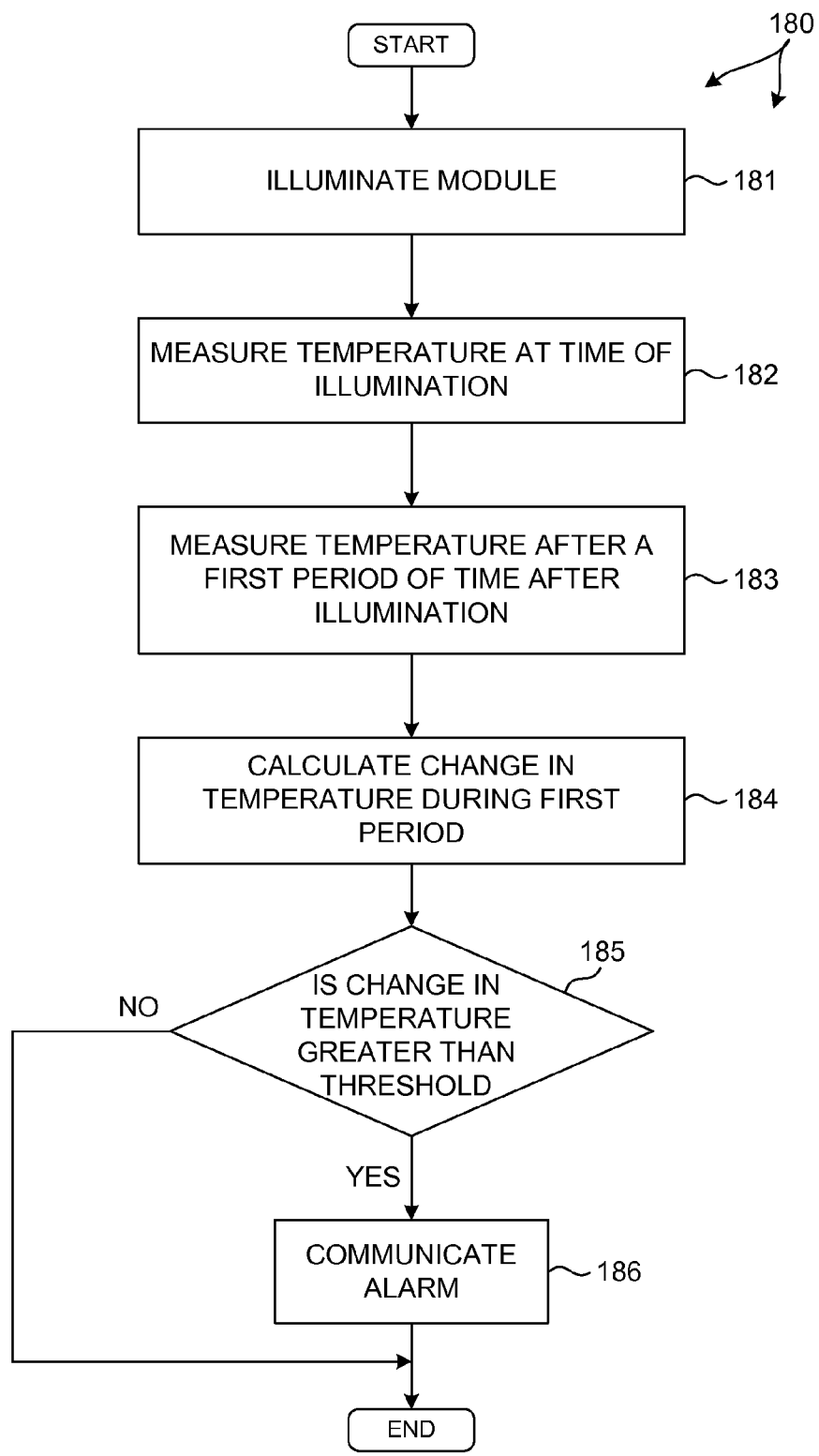
FIG. 22 illustrates a method of identifying the potential for failure of a luminaire before actual failure based on analysis of a temperature transient at start-up.

FIG. 22 illustrates a method 180 of identifying the potential for failure of a luminaire 150 before actual failure based on analysis of a temperature transient at start-up. In a first step (step 181) an LED based module is illuminated. In a second step (step 182) the temperature of the module is measured at the time of illumination. In a third step (step 183) the temperature of the module is measured after a first period of time has elapsed from the point in time when module 100 is illuminated. In a fourth step (step 184) the change in temperature of module 100 is calculated by taking the difference between the temperatures measured at steps 182 and 183. In a fifth step (step 185) the temperature change calculated in step 184 is compared with a threshold value. If the change in temperature exceeds the threshold value, module 100 communicates an alarm (step 186).

Figure 23:
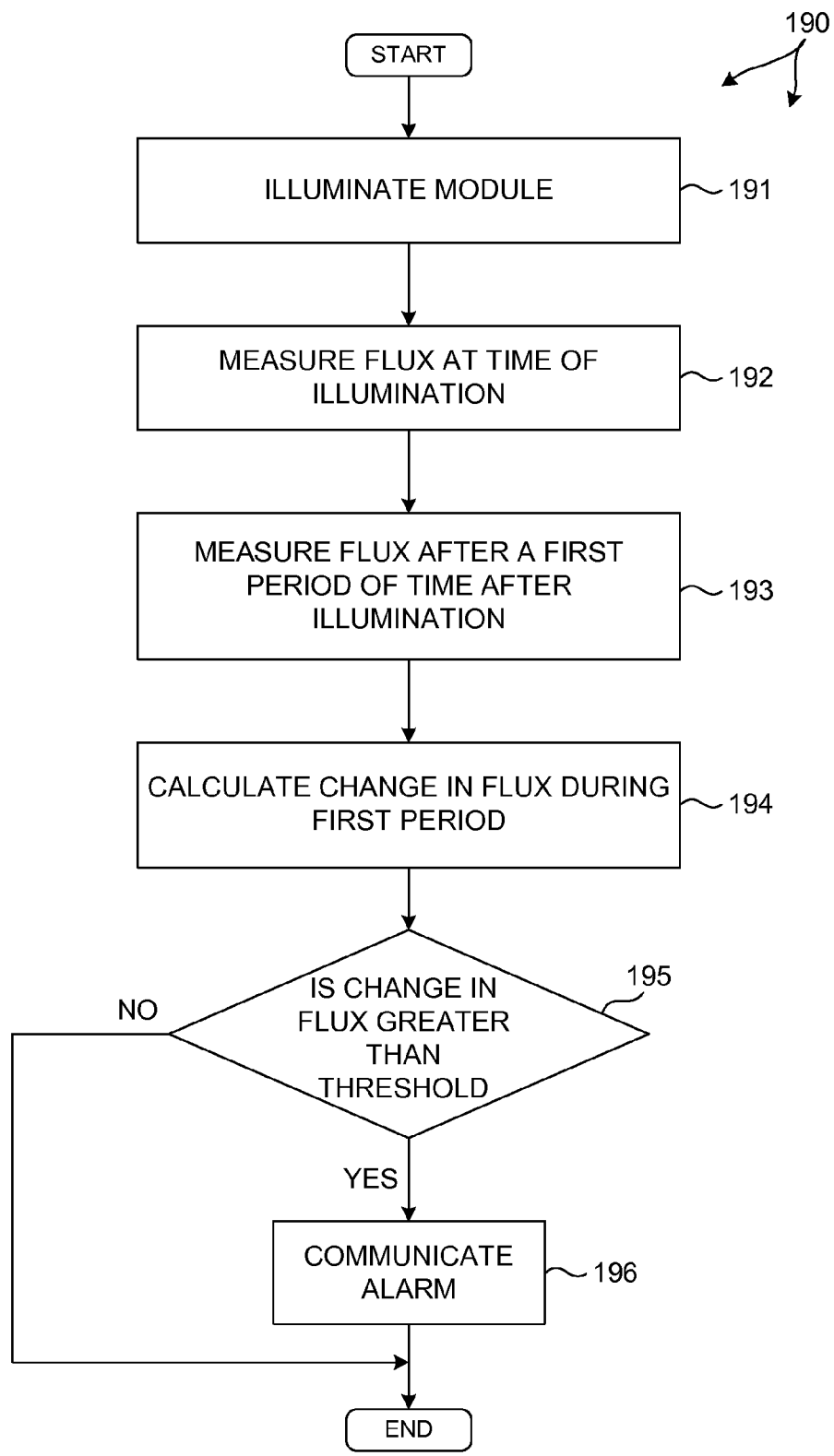
FIG. 23 illustrates a method of identifying the potential for failure of a luminaire before actual failure based on analysis of a flux transient at start-up.

FIG. 23 illustrates a method 190 of identifying the potential for failure of a luminaire 150 before actual failure based on analysis of a flux transient at start-up. In a first step (step 191) an LED based illumination module is illuminated. In a second step (step 192) the flux output of the module is measured at the time of illumination. In a third step (step 193) the flux output of the module is measured after a first period of time has elapsed from the point in time when module 100 is illuminated. In a fourth step (step 194) the change in flux of module 100 is calculated by taking the difference between the flux measured at steps 192 and 193. In a fifth step (step 195) the flux change calculated in step 194 is compared with a threshold value. If the change in flux exceeds the threshold value, module 100 communicates an alarm (step 196).

Figure 24:
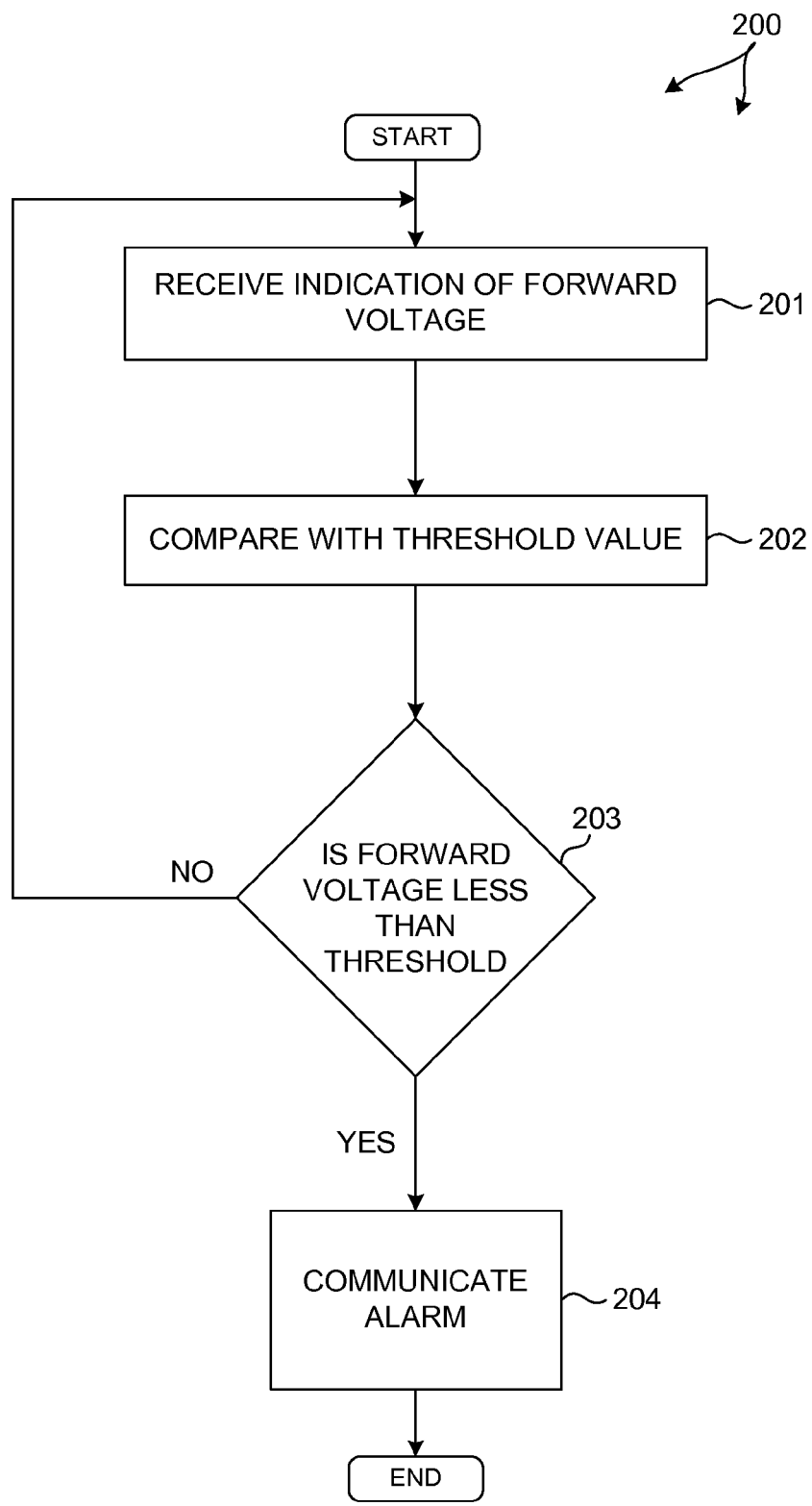
FIG. 24 illustrates a method of identifying the failure of an LED in the illumination module based on a measurement of the forward voltage of a string of LEDs.

FIG. 24 illustrates a method of identifying the failure of an LED 102 of module 100 based on a measurement of the forward voltage of a string of LEDs 102. In a first step (step 201) an indication of forward voltage is received. In one embodiment, the indication may be received from power converter 30. In another embodiment, the indication may be received from a voltage sensor (not shown) of mounting board 104 via sensor interface 28. In a second step (step 202) the indication of forward voltage is compared with a threshold value. In a third step (step 203) the forward voltage is compared with a threshold value. If the forward voltage exceeds the threshold value, module 100 communicates an alarm (step 204).

Figure 25:
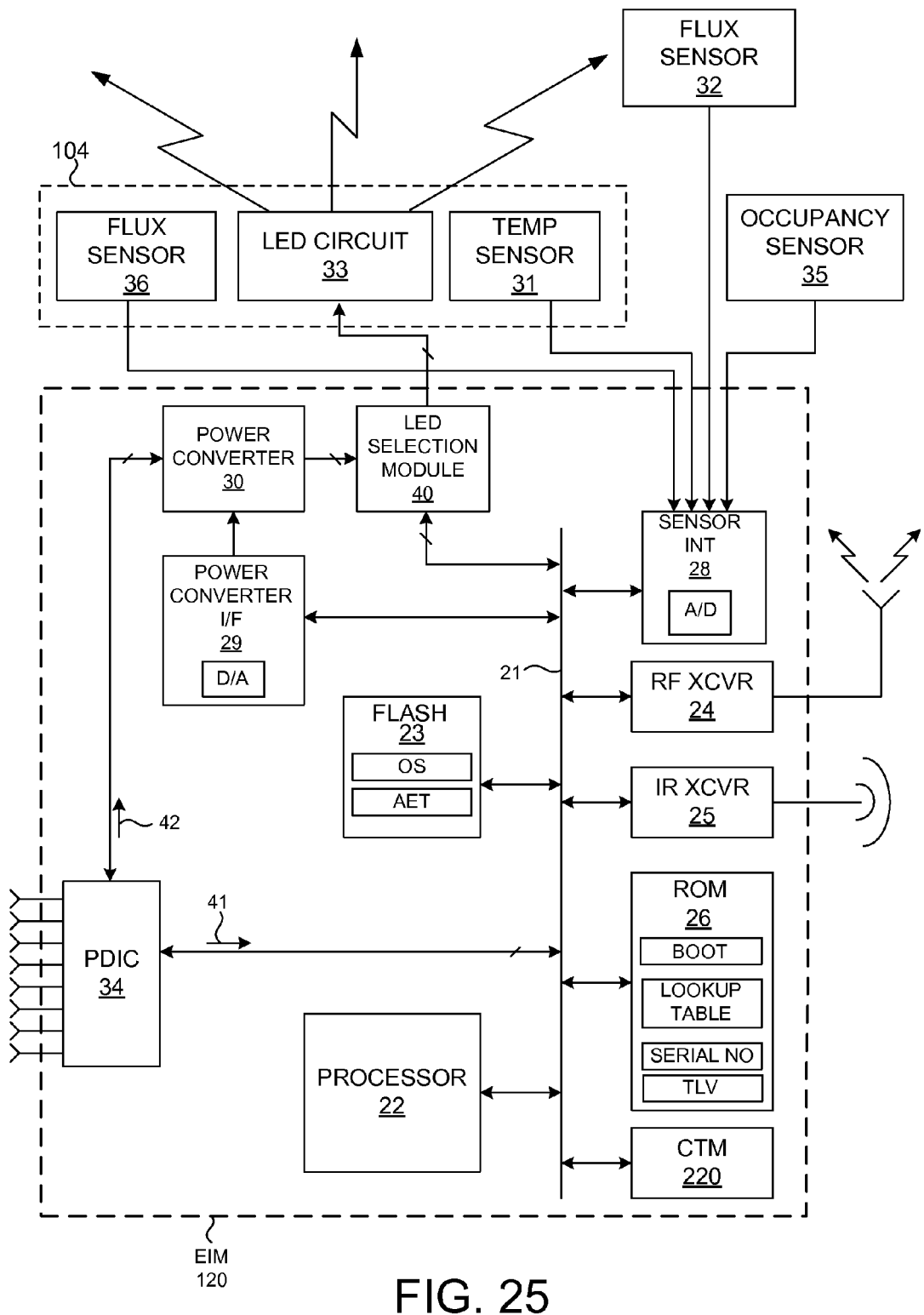
FIG. 25 is a schematic diagram illustrative of an electrical interface module that includes a Color Tuning Module.

As depicted in FIG. 25, EIM 120 may also include Color Tuning Module (CTM) 220. In some embodiments, CTM 220 is a dedicated hardware module including memory and processing capability. In some other embodiments, processor 22 may include CTM functionality on-chip. In other embodiments, CTM functionality may be achieved by processor 22 executing software instructions stored in memory (e.g., memory 23). CTM 220 tunes the current supplied to different strings of LEDs to achieve consistent color characteristics over the lifetime of module 100.

Figure 26A:
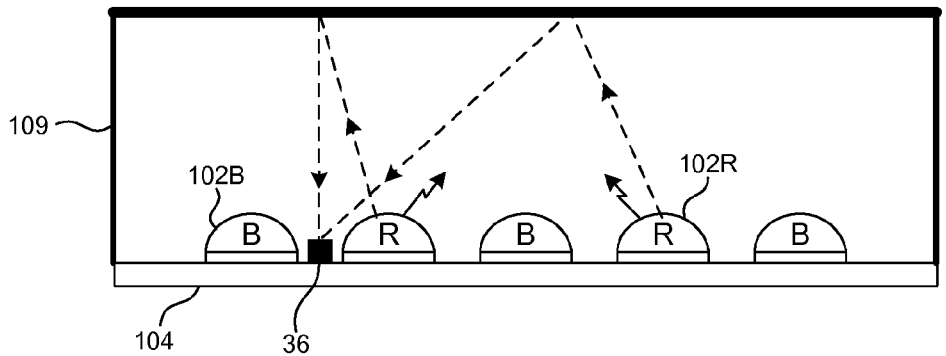
FIGS. 26A-26B illustrate a mounting board with mounted red LEDs and blue LEDs.
Figure 26B:
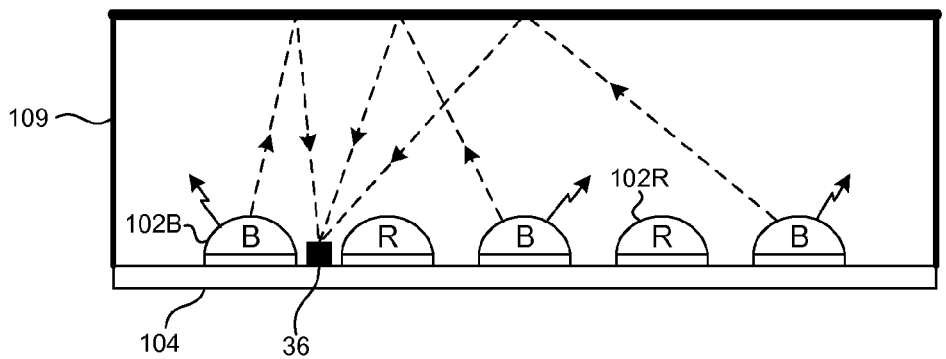

FIGS. 26A-26B illustrate mounting board 104 with mounted red LEDs 102R and blue LEDs 102B, collectively referred to as LEDs 102. LEDs 102 emit light into cavity 109. Flux sensor 36 is also mounted to mounting board 104 in the illustrated embodiment. In other embodiments flux sensor 36 may be mounted within cavity 109 on the walls of cavity 109 or the output window 108. In yet other embodiments, flux sensor 36 may be mounted on reflector 140 as discussed with respect to FIG. 9.

Figure 27:
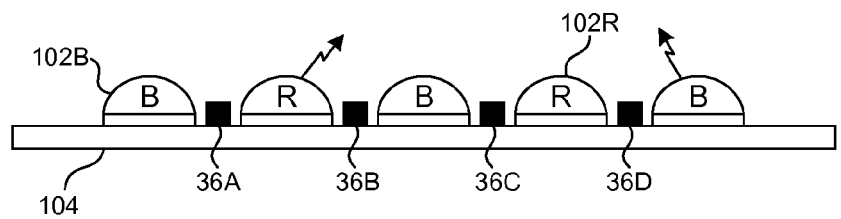
FIG. 27 is illustrates a plurality of flux sensors on the mounting board.

FIG. 27 is illustrative of an embodiment that employs a plurality of flux sensors (e.g., flux sensors 36A-36D). The output of flux sensors 36A-36D may be averaged to obtain an average value of flux intensity in cavity 109. In other embodiments, the output of each sensor 36A-36D may be considered separately to obtain local information about the flux intensity in the area captured by each individual sensor. This local information may be useful to evaluate flux uniformity within cavity 109. Because each sensor 36A-36D is most sensitive to LEDs 102 that are in closest proximity to each sensor, local information may also be useful to characterize individual LEDs 102.

Figure 28:
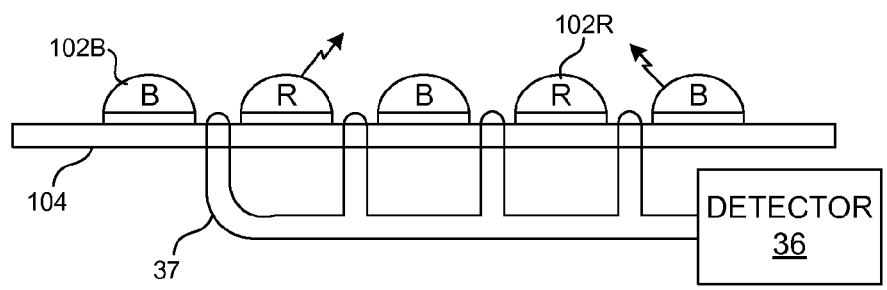
FIG. 28 illustrates an optical waveguide directing light from the surface of mounting board at multiple locations to a flux sensor.

FIG. 28 is illustrative of an embodiment where an optical waveguide 37 directs light at the surface of mounting board 104 in multiple locations to a flux sensor 36. In this embodiment, optical waveguide 37 is employed to gather light from multiple locations on mounting board 104 for flux measurement. In this manner, flux intensity values from a number of locations on mounting board 104 may be aggregated by optical waveguide 37 and measured by flux sensor 36. In one example, optical waveguide 37 may be manufactured as an injection molded part. In another example, optical waveguide 37 may be an optical fiber.

Figure 29A:
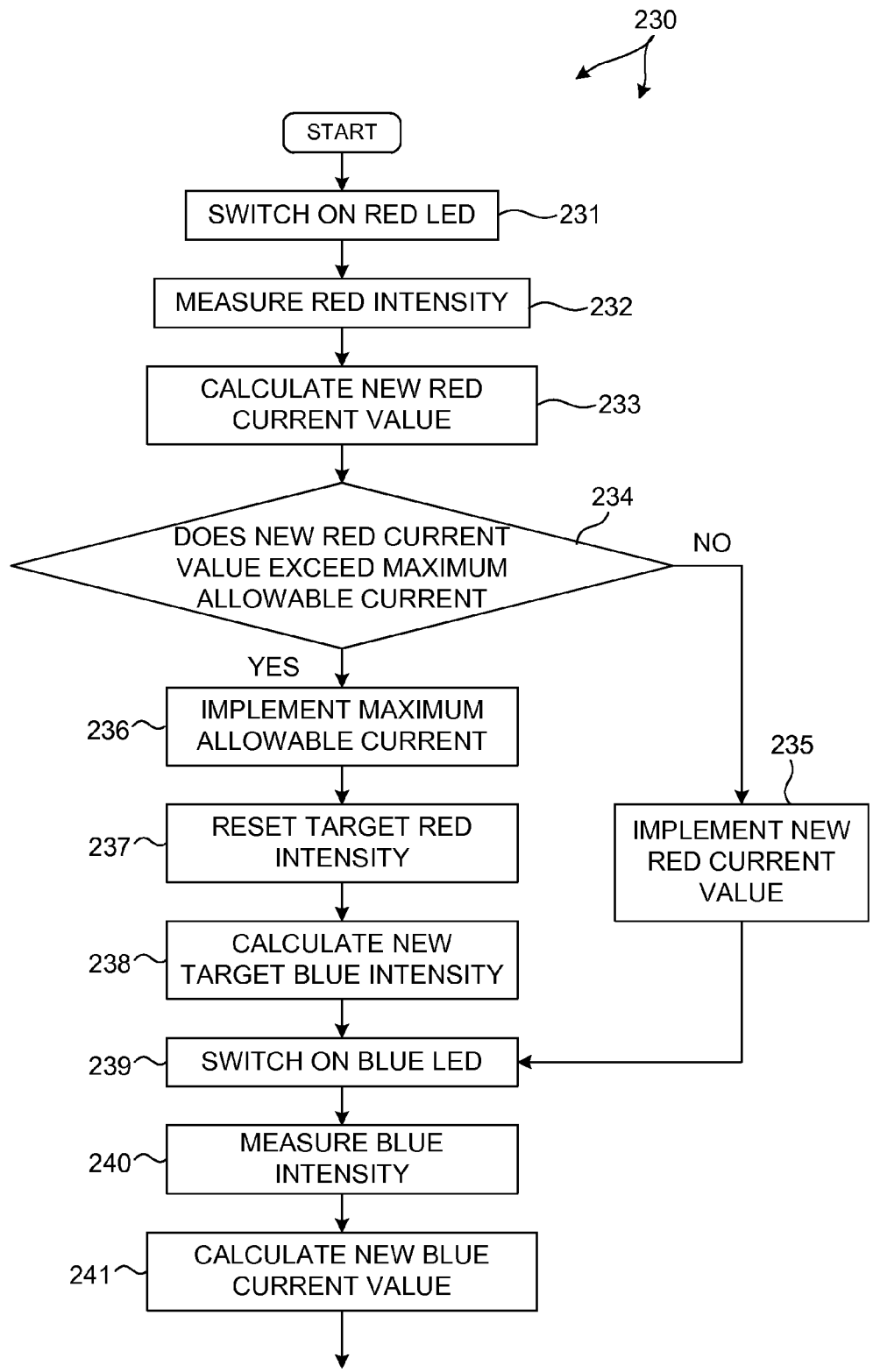
FIGS. 29A-29B illustrate a method for matching intensity between red and blue LEDs over the lifetime of module.
Figure 29B:
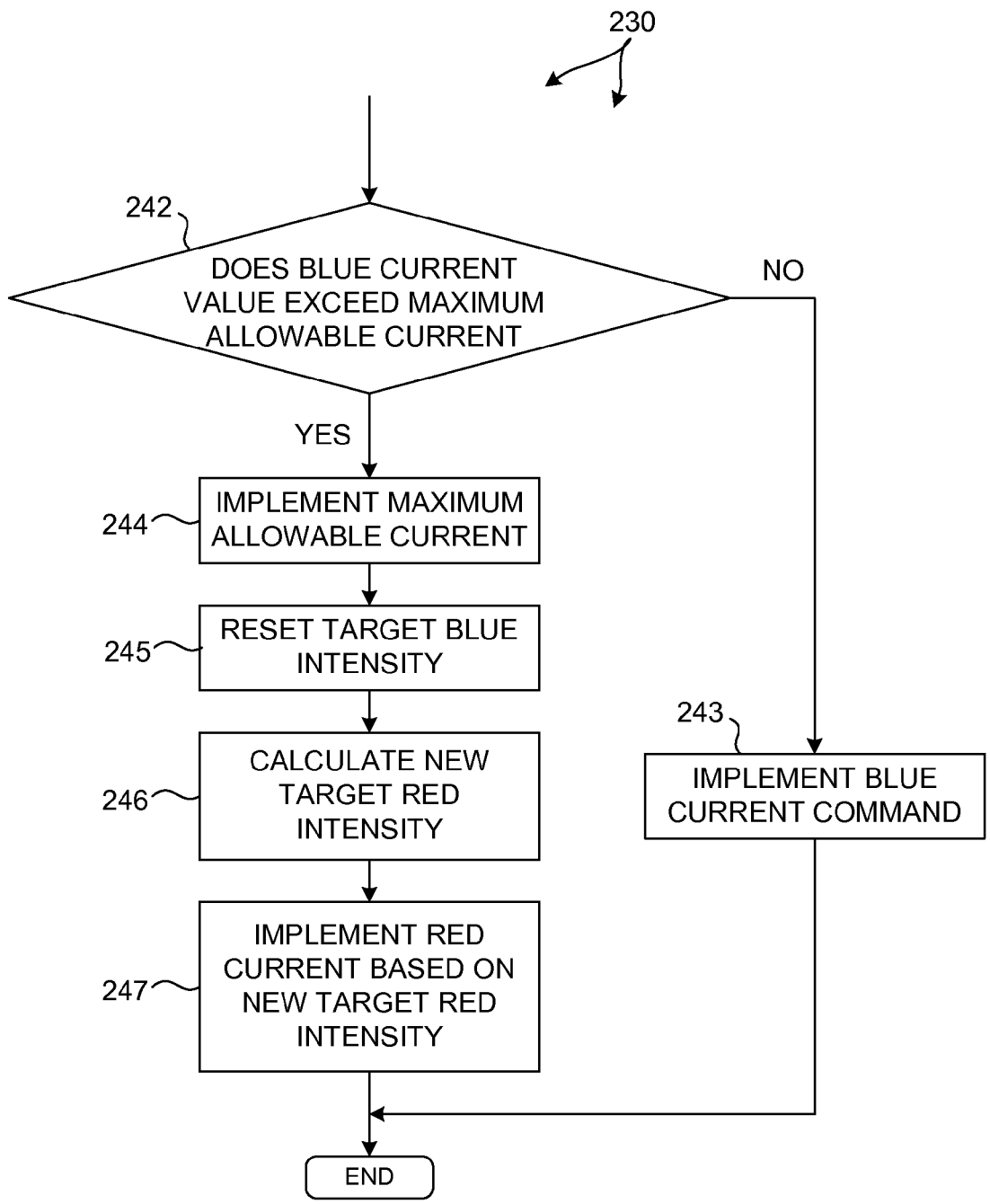

FIGS. 29A-29B illustrate a method 230 executed by CTM 220 for matching intensity between red and blue LEDs over the lifetime of module 100. In a first step (step 231), red LEDs 102R of module 100 are illuminated by a test current, $i_{test\_red}$, passed through red LEDs 102R. In one example, $i_{test\_red}$ may be 0.700 Ampere. For the period of time under test, blue LEDs 102B of module 100 remain turned off. In a second step (step 232), the flux intensity of light emitted from the red LEDs 102R is measured by flux sensor 36 to generate a red intensity value under test, $I_{test\_red}$. In a third step (step 233), a new red current value is calculated based on the results of the red intensity measured in step 232. In one example, the assumption is made that over a small range of intensity values, the luminous output of red LEDs 102R is linearly related to the drive current. Based on this assumption, CTM 220 calculates a new red current value to drive red LEDs 102R to a target flux intensity value, $I_{target\_red}$.

$$i_{target\_red} = \frac{I_{target\_red}}{I_{test\_red}} i_{test\_red} \tag{14}$$

In a fourth step (step 234), the determination is made whether the new current value, $i_{target\_red}$, exceeds the maximum allowable drive current associated with red LEDs 102R. If the new current value does not exceed the maximum allowable drive current, the new current value is implemented (step 235). However, if the new current value exceeds the maximum allowable drive current, then the maximum allowable drive current is implemented (step 236). Because the new current value cannot be implemented in this case, the target flux intensity value is reset to a lower value (step 237).

$$I_{target\_red} = \frac{I_{test\_red}}{i_{test\_red}} \cdot i_{max\_red} \tag{15}$$

In addition, because the target flux intensity value for red is revised downward, the target flux intensity value for blue is also revised downward (step 238). The revised target flux intensity value is calculated such that the ratio of flux intensity of emission from red LEDs 102R and blue LEDs 102B remains constant over the lifetime of module 100.

$$I_{target\_blue} = \left(\frac{I_B}{I_R}\right)_{Lifetime} \cdot I_{target\_red} \tag{16}$$

In step 239, blue LEDs 102B of module 100 are illuminated by a test current, $i_{test\_blue}$, passed through blue LEDs 102B. In one example, $i_{test\_blue}$ may be 0.700 Ampere. For the period of time under test, red LEDs 102R of module 100 remain turned off. In a next step (step 240), the flux intensity of light emitted from the blue LEDs 102B is measured by flux sensor 36 to generate a blue intensity value under test, $i_{test\_blue}$. In step 241, a new blue current value is calculated based on the results of the blue intensity measured in step 240. In one example, the assumption is made that over a small range of intensity values, the luminous output of blue LEDs 102B is linearly related to the drive current. Based on this assumption, a new blue current value is calculated to drive blue LEDs 102B to a target flux intensity value, $I_{target\_blue}$.

$$i_{target\_blue} = \frac{I_{target\_blue}}{I_{test\_blue}} i_{test\_blue} \qquad (17)$$

In a next step (step 242), the determination is made whether the new current value, $i_{target\_blue}$, exceeds the maximum allowable drive current associated with blue LEDs 102B. If the new current value does not exceed the maximum allowable drive current, the new current value is implemented (step 243). However, if the new current value exceeds the maximum allowable drive current, then the maximum allowable drive current is implemented (step 244). Because the new current value cannot be implemented in this case, the target flux intensity value is reset (step 245).

$$I_{target\_blue} = \frac{I_{test\_blue}}{i_{test\_blue}} \cdot i_{max\_blue} \qquad (18)$$

In addition, because the target flux intensity value for blue is revised downward, the target flux intensity value for red is also revised downward (step 246). The revised target flux intensity value is calculated such that the ratio of flux intensity of emission from red LEDs 102R and blue LEDs 102B remains constant over the lifetime of module 100.

$$I_{target\_red} = \left(\frac{I_B}{I_R}\right)_{Lifetime} \cdot I_{target\_blue} \qquad (19)$$

Based on the revised target flux intensity value for red LEDs 102R a new red current value is calculated (step 247) and implemented.

$$i_{target\_red} = \frac{I_{target\_red}}{I_{test\_red}} i_{test\_red} \qquad (20)$$

Figure 30:
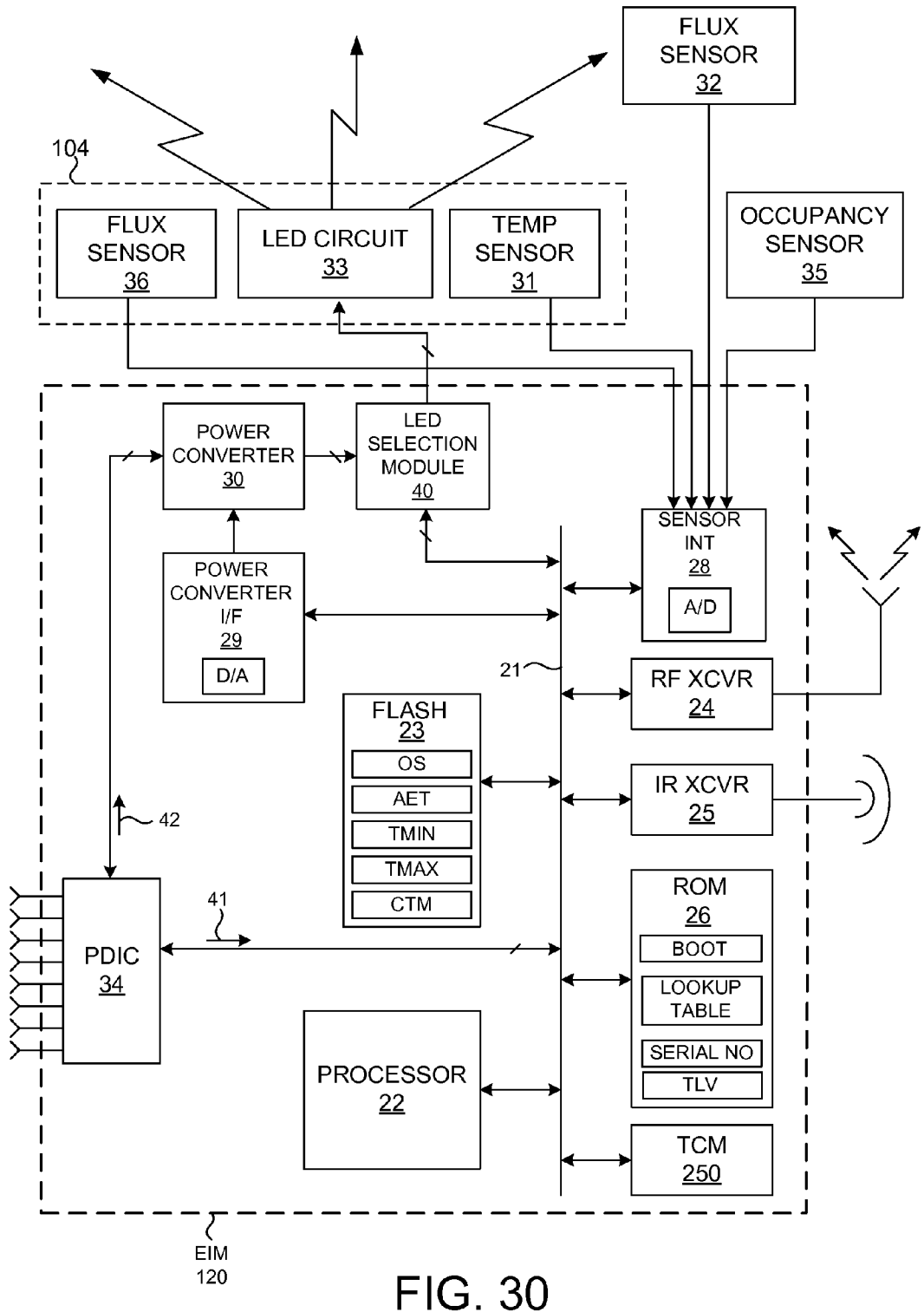
FIG. 30 is a schematic diagram illustrative of an electrical interface module that includes a Temperature Compensation Module.

As depicted in FIG. 30, EIM 120 may also include a Temperature Compensation Module (TCM) 250. TCM 250 tunes the current supplied to different strings of LEDs of illumination module 100 to achieve consistent color characteristics over the operating temperature range of module 100. In one example, module 100 may include a string of red LEDs and a string of blue LEDs. The change in flux output of a red LED is different than the change in flux output of a blue LED as operating temperature changes.

Figure 31:
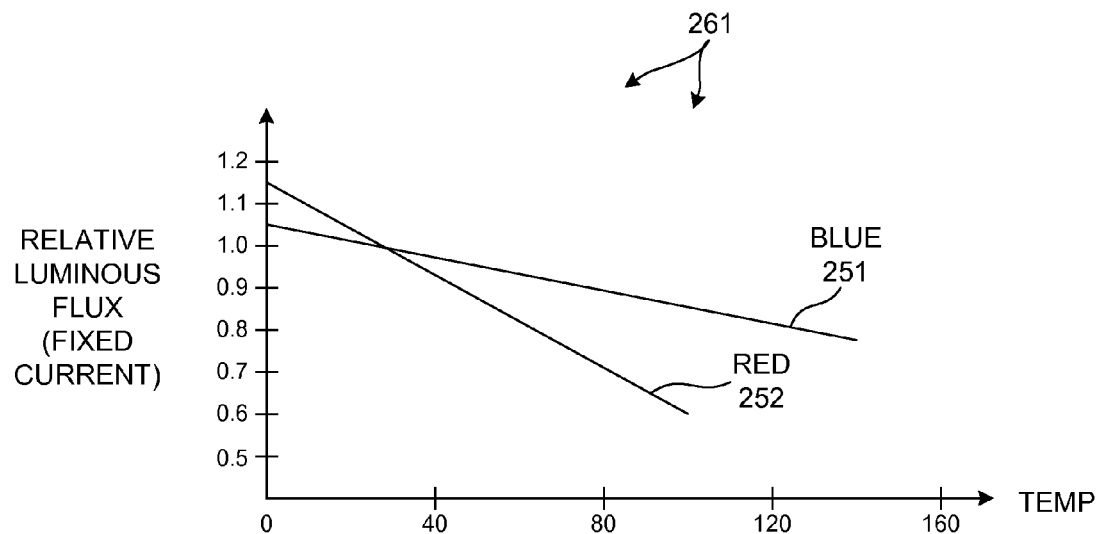
FIG. 31 illustrates the relative luminous flux output of a red LED (AlInGaP) and a blue LED over a range of package temperatures.
Figure 32:
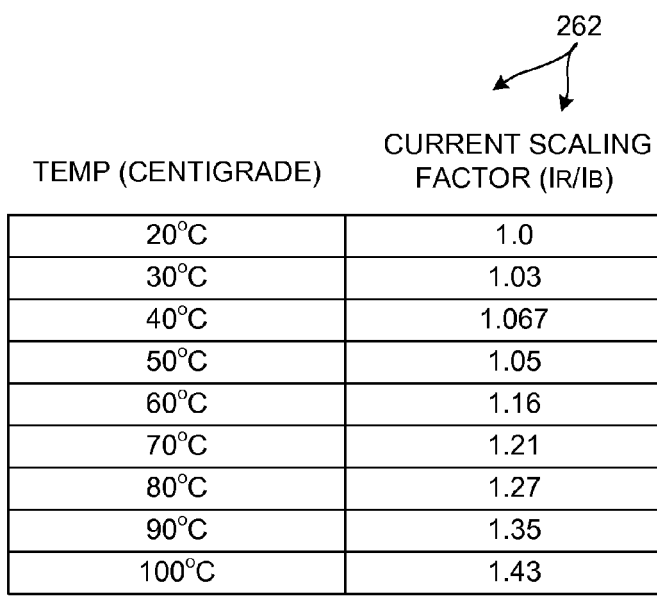
FIG. 32 illustrates a table including current scaling factors relating the current supplied to a red LED and a blue LED over a range of operating temperatures.

FIG. 31 illustrates the relative luminous flux output of a red LED (AlInGaP) and a blue LED over a range of package temperatures as provided by LumiLEDs Corporation (San Jose, Calif.). Both the degradation in luminous flux output of the blue LED 251 and the degradation in luminous flux of the red LED 252 are visible. It is clear from FIG. 31 that the degradation of the luminous flux output of blue and red LEDs as temperature increases may be very different. FIG. 32 illustrates a table including current scaling factors relating the current supplied to a red LED and a blue LED over a range of operating temperatures. Under the assumption that the relationship between current and flux is linear at a given temperature and over the normal operating current range, a current scaling factor can be estimated from FIG. 31 for a number of temperatures. The current scaling factor ($i_{red}/i_{blue}$) may be used to scale either the red LED drive current or the blue LED drive current to maintain a fixed relationship between the luminous flux output of red and blue LEDs over a range of operating temperatures.

Figure 33:
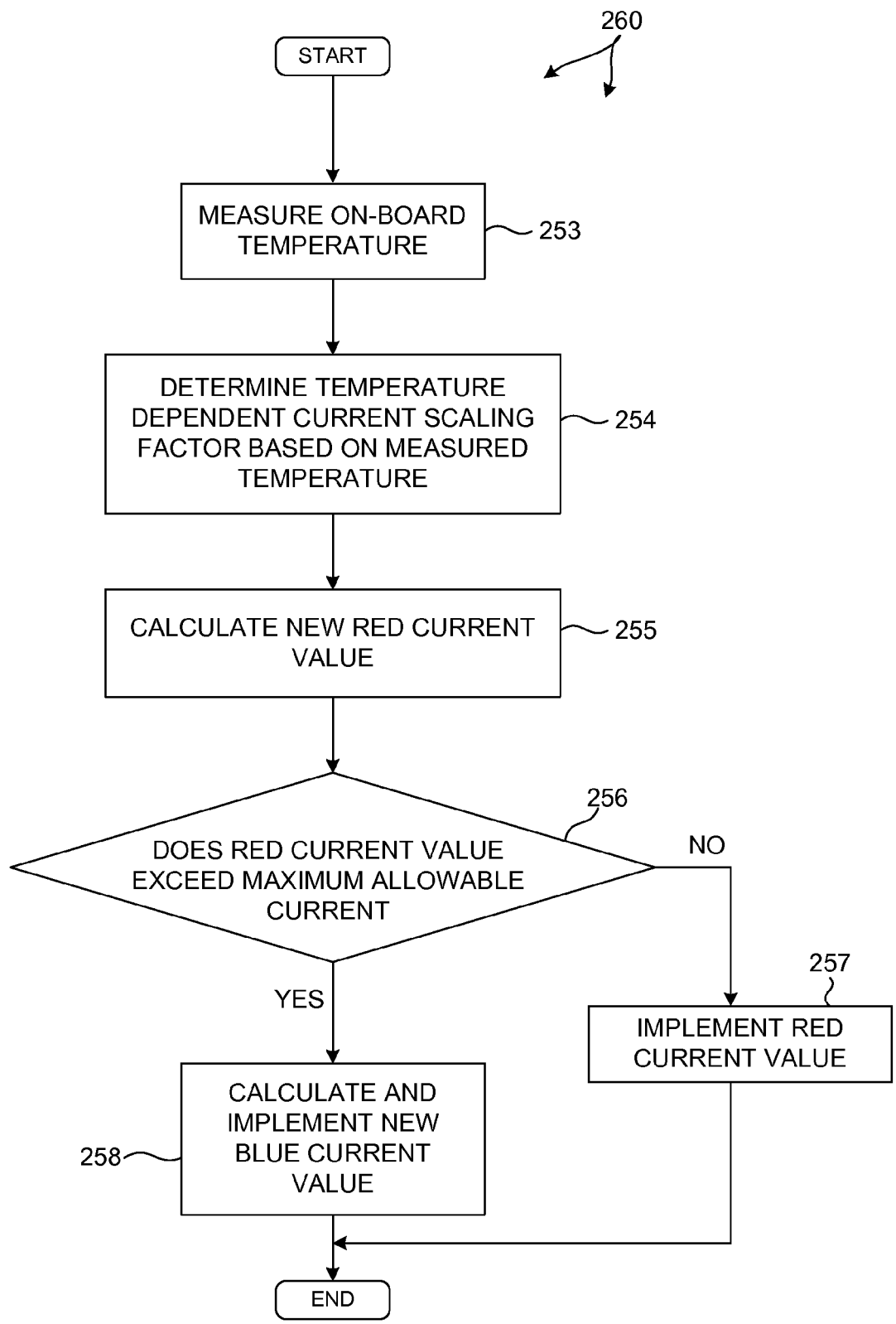
FIG. 33 illustrates a method of tuning the current supplied to different strings of LEDs of illumination module to achieve consistent color characteristics over the operating temperature range of module.

FIG. 33 illustrates a method 260 of tuning the current supplied to different strings of LEDs of illumination module 100 to achieve consistent color characteristics over the operating temperature range of module 100. In a first step (step 253), the temperature of module 100 is measured. In a second step (step 254) a current scaling factor is determined based on the measured temperature. The current scaling factor may be read from a look-up table stored in non-volatile memory 23 of EIM 120. In one example, the current scaling factor may be directly read from the look-up table. In another example, the current scaling factor may be result from interpolating values stored in the look-up table. In another example, the current scaling factor may be calculated based on a function stored in non-volatile memory 23 of EIM 120. In a third step, (step 255) a new red current value is calculated based on the current scaling factor and a nominal current stored in non-volatile memory 23 of EIM 120.

$$i_{target\_red} = \frac{i_{red_T}}{i_{blue_T}} i_{nom\_red} \qquad (21)$$

In a fourth step (step 256), an evaluation is made whether the new red current value exceeds the maximum allowable current, a predetermined value, for red LEDs 102R. If not, the red current value is implemented (step 257). If so, a new blue current value is calculated and implemented (step 258). The new blue current value may be calculated as follows:

$$i_{target\_blue} = \frac{i_{blue_T}}{i_{red_T}} i_{nom\_blue} \qquad (22)$$

A current ratio relating the red and blue current values after the execution of method 230 may be calculated. This current ratio may be associated with the temperature of module 100 during the execution of the method. Because method 230 results in current values tuned to achieve the target intensity ratio between red and blue LEDs, no further scaling of currents is required at that temperature. Thus, in a variation of method 260, the temperature dependent current scaling factors may be normalized about the temperature of the execution of method 230 before use during the execution of method 260.

In some embodiments, the methods described above may be executed in part or in total by elements of EIM 120. However, in some other embodiments, the aforementioned methods may be executed in part or in total by a remote device that is communicatively coupled to LED based illumination module 100. In these embodiments, some or all of the computational burden associated with executing the aforementioned methods may be relieved from LED based illumination module 100. In addition, it may be desirable to communicate aspects of the performance of LED based illumination module 100 to an entity (e.g., customer, maintenance staff, user, etc.) using a remote device (e.g., mobile computer, personal computer, dedicated handheld device, etc.). Furthermore, it may be desirable to receive information from the entity to determine future operational commands to LED based illumination module 100.

Figure 36:
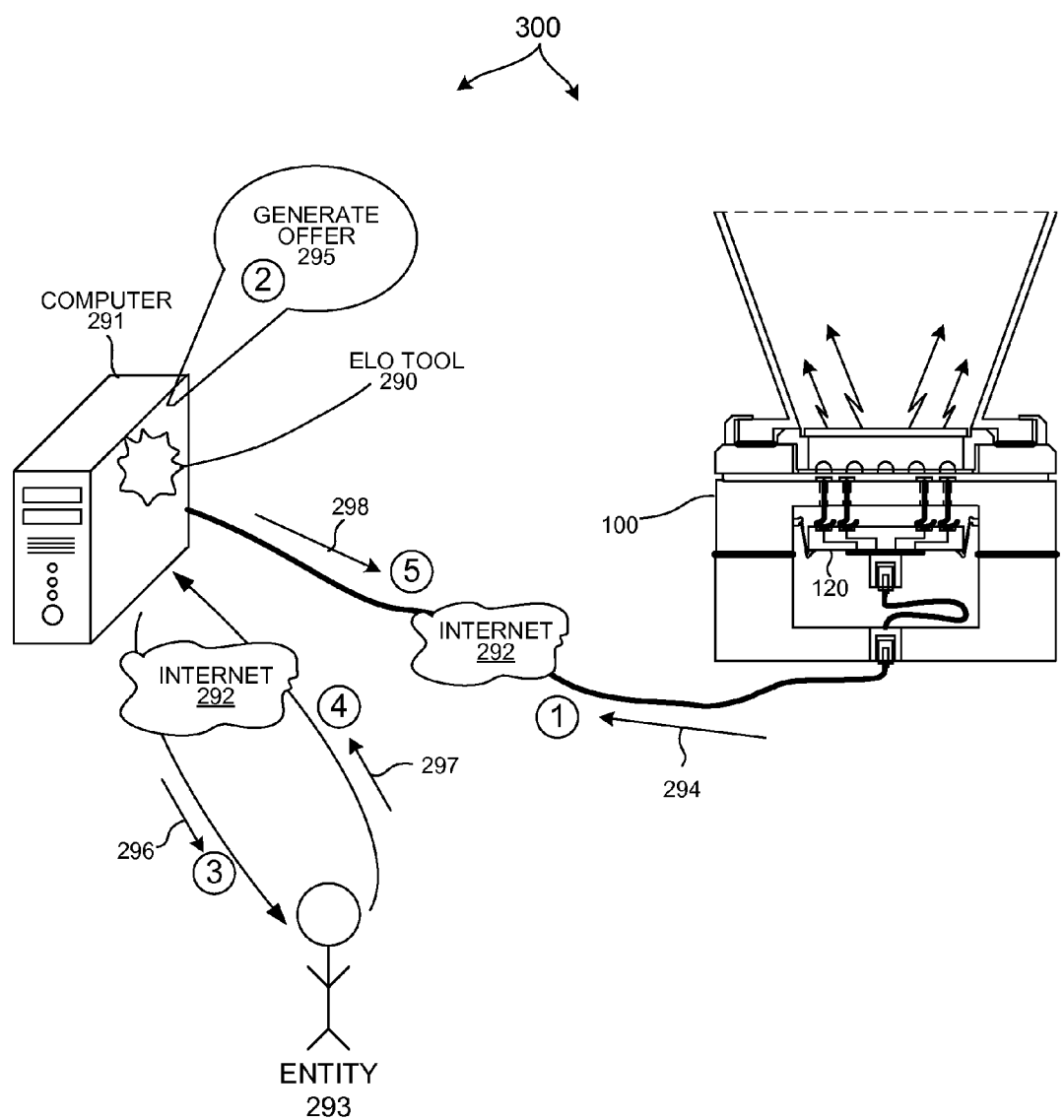
FIG. 36 illustrates an exemplary embodiment of a system that involves LED based illumination module, a computer communicatively coupled to LED based illumination module, and an entity interacting with computer.

FIG. 36 illustrates an exemplary embodiment of a system 300 that involves LED based illumination module 100, a computer 291 communicatively coupled to LED based illumination module 100, and an entity 293 interacting with computer 291. In some embodiments, computer 291 may be communicatively coupled to LED based illumination module 100 over the internet 292. However, in some other embodiments, computer 291 may be communicatively coupled to LED based illumination module 100 by other communication means (e.g., LAN, RF, IR, etc.). This may be desirable to avoid the expense of incorporating internet connectivity in every LED based illumination module 100. In another example, computer 291 may communicate with LED based illumination module indirectly. For example a computer (not shown) may be local to and communicatively coupled to LED based illumination module 100. This computer may also be configured to communicate with computer 291 over the internet 292. In this manner, a local computer stands between computer 291 and LED illumination module 100. For example, the computer may be a local, centralized light management server. Computer 291 may interact with entity 293 over the internet 292 (e.g., entity 293 interacts with computer 291 over the internet using a web based interface). In some other embodiments, computer 291 may interact with entity 293 locally (e.g., over a local application interface).

Computer 291 may be a dedicated computer operated by, for example, a lighting management services organization. In these embodiments, computer 291 communicates over the internet with LED based illumination module 100 directly or indirectly and communicates with a customer over the internet. In some embodiments, computer 291 collects data from many LED based illumination modules 100 and executes the methods described in this patent document. For example, computer 291 may collect data concerning the AET of each module, operating current levels, operating temperature levels, and lumen degradation data over time. Based on this aggregated data, computer 291 may determine a refined lifetime estimation for LED based illumination module 100.

In the embodiment illustrated in FIG. 36, an "Extended Lifetime Offer" (ELO) tool 290 is executed by computer 291. As illustrated in FIG. 36, ELO tool 290 is an application that facilitates interaction of entity 293 with LED based illumination module 100. In one example, LED based illumination module 100 communicates a message 294 to computer 291 that indicates the difference between the AET and the TLV of LED based illumination module and the estimated remaining lifetime of LED based illumination module 100. Based on the received message 294, ELO tool 290 generates an extended lifetime offer 295. In the case where the estimated remaining lifetime of LED based illumination module 100 exceeds the difference between the AET and TLV of the module, it is expected that the useful operational lifetime of LED based illumination module may be extended beyond the initial TLV. In one example, an offer 295 may be generated to extend the operational lifetime of LED based illumination module 100 by the amount of time that the estimated remaining lifetime exceeds the difference between the AET and TLV of the module in exchange for payment.

In another example, LED based illumination module 100 communicates a message 294 that indicates the AET and the estimated elapsed lifetime of LED based illumination module 100. Based on the received message 294, ELO tool 290 generates an extended lifetime offer 295. In the case where the AET exceeds the estimated elapsed lifetime of LED based illumination module, it is expected that the useful operational lifetime of LED based illumination module may be extended beyond the initial TLV. In one example, an offer 295 may be generated to extend the operational lifetime of LED based illumination module 100 by the amount that the AET exceeds the estimated elapsed lifetime of LED based illumination module 100 in exchange for payment.

Computer 291 communicates a message 296 including the extended lifetime offer 295 to entity 293. Entity 293 may choose to accept the offer, and send a reply message 294 to computer 291 indicating acceptance of the extended lifetime offer 295. In response, computer 291 communicates a message 298 to LED based illumination module 100 indicating that LED based illumination module 100 is authorized to operate for an extended lifetime period. For example, message 298 may include an updated TLV value that exceeds the initially programmed TLV value. In another example, message 298 may include an unlock code that enables a different TLV value to be utilized that exceeds the initial TLV value.

As discussed above, ELO tool 290 generates extended lifetime offer 295 based on the extended lifetime estimate associated with a specific LED based illumination module 100. However, ELO tool 290 may also be communicatively coupled to many LED based illumination modules (e.g., thousands of modules). In some examples, ELO tool 290 may generate extended lifetime offer 295 based on operational information collected from many modules. For example, based on operational information collected from many modules, it may be determined that the lifetime expectancy of modules of a particular product code or family may have longer useful lifetimes than initially expected. In some other examples, the combination of operational information collected from many modules and information specific to LED base illumination module 100 may be used as the basis to generate extended lifetime offer 295.

Although certain specific embodiments are described above for instructional purposes, the teachings of this patent document have general applicability and are not limited to the specific embodiments described above. In one example, EIM 120 is described as including bus 21, powered device interface controller (PDIC) 34, processor 22, elapsed time counter module (ETCM) 27, an amount of non-volatile memory 26 (e.g., EPROM), an amount of non-volatile memory 23 (e.g., flash memory), infrared transceiver 25, RF transceiver 24, sensor interface 28, power converter interface 29, power converter 30, and LED selection module 40. However, in other embodiments, any of these elements may be excluded if their functionality is not desired. In another example, PDIC 34 is described as complying with the IEEE 802.3 standard for communication. However, any manner of distinguishing power and data signals for purposes of reception and transmission of data and power may be employed. In another example, the communication of an alarm has been discussed as a response to various conditions. However, other responses may be contemplated including shutting down module 100, requesting a code to continue operation, or turning on additional LEDs (e.g., commanding LED selection module 40 to turn on additional LEDs). In another example, the methods described above may refer to individual LEDs or groups of LEDs. In another example, methods have been described that refer to specific colors of LEDs (e.g., red LEDs and blue LEDs) or specific colors of phosphor emission (e.g., red phosphors and yellow phosphors). However, the above-described methods may apply to any color LEDs or any color phosphor emission. In another example, detectors have been described with measurement capability over the visible light range. However, detectors with sensitivity to particular wavelength ranges may be employed. In another example, methods have been discussed that scale back output intensity targets as LEDs degrade. However, additional, unused LEDs may be included as part of module 100 and selectively turned on using LED selection module 40 to replace failed LEDs or to increase the output intensity capability of module 100.

Accordingly, various modifications, adaptations, and combinations of various features of the described embodiments can be practiced without departing from the scope of the invention as set forth in the claims.

What is claimed is:

1. A method comprising:
   measuring a temperature of an LED based illumination module;
   determining a current scaling factor based on the measured temperature, wherein the current scaling factor relates a first current value applied to a first LED in the LED based illumination module with a first color emission characteristic to a second current value applied to a second LED in the LED based illumination module with a second color emission characteristic that is different than the first color emission characteristic;
   determining a first target current value based on the current scaling factor and a first nominal current value associated with the first LED with the first color emission characteristic;
   comparing the first target current value to a predetermined value associated with first LED with the first color emission characteristic; and
   applying the first target current value to the first LED in response to the first target current value not exceeding the predetermined value, wherein a current value applied to the second LED with the second color emission characteristic is not altered.

2. The method of claim 1, further comprising:
   determining a second target current value based on a reciprocal of the current scaling factor and a second nominal current value associated with the second LED with the second color emission characteristic in response to the first target current value exceeding the predetermined value; and
   applying the second target current value to the second LED, wherein a current value applied to the first LED with the first color emission characteristic is not altered.

3. The method of claim 1, wherein the determining of the scaling factor involves reading a value stored in a memory of the LED based illumination module.

4. The method of claim 1, wherein the determining of the scaling factor comprises interpolating between two values stored in a memory of the LED based illumination module.

* * * * *

UNITED STATES PATENT AND TRADEMARK OFFICE
CERTIFICATE OF CORRECTION

PATENT NO. : 9,863,819 B2
APPLICATION NO. : 13/956023
DATED : January 9, 2018
INVENTOR(S) : Gerard Harbers Page 1 of 1

It is certified that error appears in the above-identified patent and that said Letters Patent is hereby corrected as shown below:

In the Claims

In Column 30, Line 8, in Claim 1, after "value associated with" insert --the--.

Signed and Sealed this
Tenth Day of December, 2019

Andrei Iancu
*Director of the United States Patent and Trademark Office*